US009785982B2

(12) United States Patent
Saito

(10) Patent No.: US 9,785,982 B2
(45) Date of Patent: Oct. 10, 2017

(54) TELECOM PROFITABILITY MANAGEMENT

(75) Inventor: Ghen Saito, Maplewood, NJ (US)

(73) Assignee: DOCO LABS, LLC, Maplewood, NJ (US)

(*) Notice: Subject to any disclaimer, the term of this patent is extended or adjusted under 35 U.S.C. 154(b) by 0 days.

(21) Appl. No.: 13/230,688

(22) Filed: Sep. 12, 2011

(65) Prior Publication Data

US 2013/0066663 A1 Mar. 14, 2013

(51) Int. Cl.
*G06Q 30/04* (2012.01)
*G06Q 40/02* (2012.01)
*G06Q 30/02* (2012.01)

(52) U.S. Cl.
CPC ............ *G06Q 30/04* (2013.01); *G06Q 40/02* (2013.01); *G06Q 30/0247* (2013.01)

(58) Field of Classification Search
CPC .... G06Q 30/04; G06Q 30/0247; G06Q 30/02; G06Q 30/0201; G06Q 30/0202; G06Q 30/0203
See application file for complete search history.

(56) References Cited

U.S. PATENT DOCUMENTS

| 6,032,132 | A * | 2/2000 | Nelson ............................. 705/34 |
| 6,298,357 | B1 * | 10/2001 | Wexler .................. G06F 17/272 715/210 |
| 6,883,004 | B2 | 4/2005 | Bahl et al. |
| 7,412,419 | B1 * | 8/2008 | Kam et al. ...................... 705/40 |
| 7,428,699 | B1 * | 9/2008 | Kane .................. G06F 17/2247 715/234 |
| 7,720,206 | B2 | 5/2010 | Devolites et al. |
| 7,761,406 | B2 | 7/2010 | Harken |
| 7,849,048 | B2 | 12/2010 | Langseth et al. |
| 7,870,503 | B1 * | 1/2011 | Levy ..................... G06F 9/4443 707/797 |
| 7,904,354 | B2 | 3/2011 | Pepe et al. |
| 8,214,275 | B1 * | 7/2012 | An et al. ......................... 705/35 |
| 2004/0143600 | A1 * | 7/2004 | Musgrove et al. ......... 707/104.1 |

(Continued)

OTHER PUBLICATIONS

Case Study: New Horizon Gets Profitable With Vertek; Al Brisard; Published on Feb. 17, 2009; As retrieved from the Wayback Machine on Apr. 25, 2009 (http://web.archive.org/web/20090509094643/http://www.billingworld.com/articles/new-horizon-gets-profitable-with-vertek.html).*

(Continued)

*Primary Examiner* — Deirdre Hatcher
(74) *Attorney, Agent, or Firm* — Dergosits & Noah LLP; Michael E. Dergosits; Todd A. Noah

(57) ABSTRACT

Billing data associated with telecom products provided by a variety of vendors is captured, normalized, and processed to calculate true profit margins by invoice, by vendor, by geographic location, by end-customer, by circuit, or combinations of these. A bill may be received from the vendor, and associated with a specific vendor profile. The vendor profile may include a validation routine specific to the vendor. A plurality of telephone numbers associated with an end-customer may be extracted from the bill based on the vendor profile and stored on a storage device. A previous bill from the vendor may be accessed in response to receiving the bill from the vendor. End-customer profitability may be determined for a first time period based on data extracted from the received bill and displayed.

13 Claims, 36 Drawing Sheets

(56) References Cited

U.S. PATENT DOCUMENTS

| | | | |
|---|---|---|---|
| 2005/0033668 A1* | 2/2005 | Garcia et al. | 705/30 |
| 2005/0125316 A1* | 6/2005 | Levering et al. | 705/30 |
| 2006/0009989 A1* | 1/2006 | McCormick | 705/1 |
| 2006/0095373 A1 | 5/2006 | Venkatasubramanian et al. | |
| 2006/0235743 A1* | 10/2006 | Long et al. | 705/10 |
| 2007/0118419 A1* | 5/2007 | Maga et al. | 705/10 |
| 2007/0165801 A1* | 7/2007 | Devolites | H04M 15/00 379/114.03 |
| 2007/0288268 A1 | 12/2007 | Weeks | |
| 2008/0249936 A1 | 10/2008 | Miller et al. | |
| 2008/0270273 A1 | 10/2008 | Koltunov et al. | |
| 2008/0285733 A1* | 11/2008 | Fisher | 379/114.03 |
| 2009/0089126 A1 | 4/2009 | Odubiyi | |
| 2009/0198599 A1 | 8/2009 | Hui et al. | |
| 2009/0327045 A1* | 12/2009 | Olives et al. | 705/10 |
| 2010/0057763 A1 | 3/2010 | Smith et al. | |
| 2010/0125617 A1 | 5/2010 | Alexander | |
| 2010/0257136 A1 | 10/2010 | Velozo et al. | |

OTHER PUBLICATIONS

Not Your Dad's Revenue Assurance: New Programs Drive Profitability; Feb. 29, 2008; as retrieved from http://www.channelpartnersonline.com/articles/2008/02/not-your-dad-s-revenue-assurance-new-programs-dri.aspx.*

* cited by examiner

```
/F861_0 50 Tf
( ) 13.9 Tj
0 -116 Td
/F863_0 37.5 Tf
(ACCOUNT NAME:) 169.4625 Tj
0 -159 Td
(TELECOMMUNICATION CO) 290.2875 Tj
0 -202 Td
(ACCOUNT NUMBER:) 185.2345Tj
0 -245 Td
(ABC-12345) 140.425 Tj
0 -288 Td
(BILL DATE:) 135.35 Tj
4 366 Td
(4/20/2011) 140.2375 T]
4 323 Td
(REF12345) 135.9875 Tj
Q
```

970 — X,Y location of the string. 0, 116

975 — Tj identifies the string found in brackets, and its length 185.4375. Depending on the type of font being used the values in these brackets may be encoded differently and would need to be translated. This is specific from profile to profile.

FIG. 9B

This would produce: (all aligned along the X axis, or the left hand side of the page)
This is then sent through a parsing routing to read line by line to identify patterns in the bill, which the profile uses to identify various Models.

ACCOUNT NAME:
TELECOMMUNICATION CO
ACCOUNT NUMBER:
ABC-12345
BILL DATE:
4/20/2011
REF12345

VENDOR X

ACCOUNT NAME: TELECOMMUNCATION CO            DATE DUE: May 20, 2011
ACCOUNT NUMBER: ABC-12345                    AMOUNT DUE: 2302.23
BILL DATE: 4/20/2011

← 1310

| Account Activity | |
|---|---|
| Previous Statement Balance | 2444.11 |
| Payment Received | -2244.11 |
| Adjustments to Previous Bill | -30.00 |
| Balance before Current Charges | 170.00 |

| Current Charges | |
|---|---|
| Amount Due | 2132.23 |
| | 2302.23 |

| Summary of Current Charges | |
|---|---|
| Late Payment Fee | 100.00 |
| Monthly Charges | 1700.00 |
| Other Charges and Credits | 300.00 |
| Usage | 10.00 |
| Taxes | 20.00 |
| Surcharges | 2.23 |
| Total Current Charges | 2132.23 |

| Payments to your Account | |
|---|---|
| 4/1/2011 Check #232 | -2244.11 |
| Total Payments | -2244.11 |

| Adjustments to your Account | |
|---|---|
| Account Credit | -30.00 |
| Total Adjustments | -30.00 |

Page 1 of 20

---

VENDOR X

ACCOUNT NAME: TELECOMMUNCATION CO
ACCOUNT NUMBER: ABC-12345
BILL DATE: 4/20/2011

2125551212
Service Address: 123 Main Street, New York, NY 10001
Monthly Charges
    Business Rate Service (VA)    100.00
Taxes & Surcharges
    Sales Tax (VST)    2.00
    Federal Surcharge (VFS)    .03

2125551213
Service Address: 123 Main Street, New York, NY 10001
Monthly Charges
    Business Rate Service (VA)    90.00
Other Charges and Credits
    Installation Fee (VISNT)    50.00
Taxes & Surcharges
    Sales Tax (VST)    2.00
    Federal Surcharge (VFS)    .03

2125551214
Service Address: 555 Peach Street, New York, NY 10009
Monthly Charges
    Business Rate Service (VA)    120.00
Usage

| Date | Time | Call to | Minutes | Amount |
|---|---|---|---|---|
| 04/18/2011 | 10:42AM | 9145551212 | 120.4 | 1.00 |
| 04/19/2011 | 10:35AM | 9145551212 | 13.2 | 0.20 |

Page 2 of 20

VENDOR X

| ACCOUNT NAME: TELECOMMUNCATION CO | DATE DUE: May 20, 2011 |
| --- | --- |
| ACCOUNT NUMBER: ABC-12345 | AMOUNT DUE: 2302.23 |
| BILL DATE: 4/20/2011 | |

Account Activity
| | |
| --- | --- |
| Previous Statement Balance | 2444.11 |
| Payment Received | -2244.11 |
| Adjustments to Previous Bill | -30.00 |
| Balance before Current Charges | 170.00 |
| | |
| Current Charges | 2132.23 |
| Amount Due | 2302.23 |

Summary of Current Charges
| | |
| --- | --- |
| Late Payment Fee | 100.00 |
| Monthly Charges | 1700.00 |
| Other Charges and Credits | 300.00 |
| Usage | 10.00 |
| Taxes | 20.00 |
| Surcharges | 2.23 |
| Total Current Charges | 2132.23 |

Payments to your Account
| | |
| --- | --- |
| 4/1/2011 Check #232 | -2244.11  ← 1315 |
| Total Payments | -2244.11 |

Adjustments to your Account
| | |
| --- | --- |
| Account Credit | -30.00  ← 1320 |
| Total Adjustments | -30.00 |

Page 1 of 20

---

VENDOR X

ACCOUNT NAME: TELECOMMUNCATION CO
ACCOUNT NUMBER: ABC-12345
BILL DATE: 4/20/2011

2125551212
Service Address: 123 Main Street, New York, NY 10001
Monthly Charges
    Business Rate Service (VA)    100.00
Taxes & Surcharges
    Sales Tax (VST)    2.00
    Federal Surcharge (VFS)    .03

2125551213
Service Address: 123 Main Street, New York, NY 10001
Monthly Charges
    Business Rate Service (VA)    90.00
Other Charges and Credits
    Installation Fee (VISNT)    50.00
Taxes & Surcharges
    Sales Tax (VST)    2.00
    Federal Surcharge (VFS)    .03

2125551214
Service Address: 555 Peach Street, New York, NY 10009
Monthly Charges
    Business Rate Service (VA)    120.00
Usage

| Date | Time | Call to | Minutes | Amount |
| --- | --- | --- | --- | --- |
| 04/18/2011 | 10:42AM | 9145551212 | 120.4 | 1.00 |
| 04/19/2011 | 10:35AM | 9145551212 | 13.2 | 0.20 |

Page 2 of 20

1205

VENDOR X

ACCOUNT NAME: TELECOMMUNCATION CO　　　DATE DUE: May 20, 2011
ACCOUNT NUMBER: ABC-12345　　　　　　　AMOUNT DUE: 2302.23
BILL DATE: 4/20/2011

Account Activity
Previous Statement Balance　　　　　　2444.11
Payment Received　　　　　　　　　　-2244.11
Adjustments to Previous Bill　　　　　　-30.00
Balance before Current Charges　　　　170.00

Current Charges　　　　　　　　　　　2132.23
Amount Due　　　　　　　　　　　　 2302.23

Summary of Current Charges　　　　　　　　1325
Late Payment Fee　　　　　　　　　　100.00
Monthly Charges　　　　　　　　　　1700.00
Other Charges and Credits　　　　　　　300.00
Usage　　　　　　　　　　　　　　　 10.00
Taxes　　　　　　　　　　　　　　　 20.00
Surcharges　　　　　　　　　　　　　 2.23
Total Current Charges　　　　　　　　2132.23

Payments to your Account
4/1/2011 Check #232　　　　　　　　-2244.11
Total Payments　　　　　　　　　　　-2244.11

Adjustments to your Account
Account Credit　　　　　　　　　　　　-30.00
Total Adjustments　　　　　　　　　　　-30.00

Page 1 of 20

---

VENDOR X

ACCOUNT NAME: TELECOMMUNCATION CO
ACCOUNT NUMBER: ABC-12345
BILL DATE: 4/20/2011

2125551212
Service Address: 123 Main Street, New York, NY 10001
Monthly Charges
　Business Rate Service (VA)　　　　　100.00
Taxes & Surcharges
　Sales Tax (VST)　　　　　　　　　　 2.00
　Federal Surcharge (VFS)　　　　　　　 .03

2125551213
Service Address: 123 Main Street, New York, NY 10001
Monthly Charges
　Business Rate Service (VA)　　　　　 90.00
Other Charges and Credits
　Installation Fee (VISNT)　　　　　　　50.00
Taxes & Surcharges
　Sales Tax (VST)　　　　　　　　　　 2.00
　Federal Surcharge (VFS)　　　　　　　 .03

2125551214
Service Address: 555 Peach Street, New York, NY 10009
Monthly Charges
　Business Rate Service (VA)　　　　　120.00
Usage

| Date | Time | Call to | Minutes | Amount |
|---|---|---|---|---|
| 04/18/2011 | 10:42AM | 9145551212 | 120.4 | 1.00 |
| 04/19/2011 | 10:35AM | 9145551212 | 13.2 | 0.20 |

Page 2 of 20

VENDOR X

ACCOUNT NAME: TELECOMMUNCATION CO          DATE DUE: May 20, 2011
ACCOUNT NUMBER: ABC-12345                   AMOUNT DUE: 2302.23
BILL DATE: 4/20/2011

Account Activity
Previous Statement Balance                  2444.11
Payment Received                           -2244.11
Adjustments to Previous Bill                 -30.00
Balance before Current Charges               170.00

Current Charges                             2132.23
Amount Due                                  2302.23

Summary of Current Charges
Late Payment Fee                             100.00
Monthly Charges                             1700.00
Other Charges and Credits                    300.00
Usage                                         10.00
Taxes                                         20.00
Surcharges                                     2.23
Total Current Charges                       2132.23

Payments to your Account
4/1/2011 Check #232                        -2244.11
Total Payments                             -2244.11

Adjustments to your Account
Account Credit                               -30.00
Total Adjustments                            -30.00

Page 1 of 20

---

VENDOR X

ACCOUNT NAME: TELECOMMUNCATION CO
ACCOUNT NUMBER: ABC-12345
BILL DATE: 4/20/2011
                                              1705

2125551212                                              1710
Service Address: 123 Main Street, New York, NY 10001
Monthly Charges
    Business Rate Service (VA)                         100.00
Taxes & Surcharges                          1715
    Sales Tax (VST)                                      2.00
    Federal Surcharge (VFS)                              .03

2125551213
Service Address: 123 Main Street, New York, NY 10001
Monthly Charges
    Business Rate Service (VA)                          90.00
Other Charges and Credits
    Installation Fee (VISNT)                            50.00
Taxes & Surcharges
    Sales Tax (VST)                                      2.00
    Federal Surcharge (VFS)                              .03

2125551214
Service Address: 555 Peach Street, New York, NY 10009
Monthly Charges
    Business Rate Service (VA)                         120.00
Usage Date        Time     Call to       Minutes    Amount
    04/18/2011  10:42AM  9145551212    120.4      1.00
    04/19/2011  10:35AM  9145551212     13.2      0.20

Page 2 of 20

FIG. 17

VENDOR X

ACCOUNT NAME: TELECOMMUNCATION CO  DATE DUE: May 20, 2011
ACCOUNT NUMBER: ABC-12345           AMOUNT DUE: 2302.23
BILL DATE: 4/20/2011

Account Activity
Previous Statement Balance          2444.11
Payment Received                   -2244.11
Adjustments to Previous Bill         -30.00
Balance before Current Charges       170.00

Current Charges                     2132.23
Amount Due                          2302.23

Summary of Current Charges
Late Payment Fee                     100.00
Monthly Charges                     1700.00
Other Charges and Credits            300.00
Usage                                 10.00
Taxes                                 20.00
Surcharges                             2.23
Total Current Charges               2132.23

Payments to your Account
4/1/2011 Check #232                -2244.11
Total Payments                     -2244.11

Adjustments to your Account
Account Credit                       -30.00
Total Adjustments                    -30.00

Page 1 of 20

__1205__

VENDOR X

ACCOUNT NAME: TELECOMMUNCATION CO
ACCOUNT NUMBER: ABC-12345
BILL DATE: 4/20/2011

2125551212
Service Address: 123 Main Street, New York, NY 10001
Monthly Charges
    Business Rate Service (VA)        100.00
Taxes & Surcharges
    Sales Tax (VST)                     2.00
    Federal Surcharge (VFS)              .03      ← 1810

2125551213  ← 1805
Service Address: 123 Main Street, New York, NY 10001
Monthly Charges
    Business Rate Service (VA)         90.00  ← 1815
Other Charges and Credits
    Installation Fee (VISNT)           50.00
Taxes & Surcharges
    Sales Tax (VST)                     2.00
    Federal Surcharge (VFS)              .03

2125551214
Service Address: 555 Peach Street, New York, NY 10009
Monthly Charges
    Business Rate Service (VA)        120.00
Usage

| Date | Time | Call to | Minutes | Amount |
|---|---|---|---|---|
| 04/18/2011 | 10:42AM | 9145551212 | 120.4 | 1.00 |
| 04/19/2011 | 10:35AM | 9145551212 | 13.2 | 0.20 |

Page 2 of 20

VENDOR X

ACCOUNT NAME: TELECOMMUNCATION CO  DATE DUE: May 20, 2011
ACCOUNT NUMBER: ABC-12345  AMOUNT DUE: 2302.23
BILL DATE: 4/20/2011

Account Activity
Previous Statement Balance              2444.11
Payment Received                       -2244.11
Adjustments to Previous Bill             -30.00
Balance before Current Charges           170.00

Current Charges                         2132.23
Amount Due                              2302.23

Summary of Current Charges
Late Payment Fee                         100.00
Monthly Charges                         1700.00
Other Charges and Credits                300.00
Usage                                     10.00
Taxes                                     20.00
Surcharges                                 2.23
Total Current Charges                   2132.23

Payments to your Account
4/1/2011 Check #232                    -2244.11
Total Payments                         -2244.11

Adjustments to your Account
Account Credit                           -30.00
Total Adjustments                        -30.00

Page 1 of 20

---

VENDOR X

ACCOUNT NAME: TELECOMMUNCATION CO
ACCOUNT NUMBER: ABC-12345
BILL DATE: 4/20/2011 ← 1905

2125551212 ← 1910
Service Address: 123 Main Street, New York, NY 10001
Monthly Charges
    Business Rate Service (VA)                   100.00
Taxes & Surcharges           ← 1915
    Sales Tax (VST)  ← 1920                        2.00
    Federal Surcharge (VFS)  ← 1925                 .03

2125551213
Service Address: 123 Main Street, New York, NY 10001
Monthly Charges
    Business Rate Service (VA)                    90.00
Other Charges and Credits
    Installation Fee (VISNT)                      50.00
Taxes & Surcharges
    Sales Tax (VST)                                2.00
    Federal Surcharge (VFS)                         .03

2125551214
Service Address: 555 Peach Street, New York, NY 10009
Monthly Charges
    Business Rate Service (VA)                   120.00
Usage

| Date | Time | Call to | Minutes | Amount |
|---|---|---|---|---|
| 04/18/2011 | 10:42AM | 9145551212 | 120.4 | 1.00 |
| 04/19/2011 | 10:35AM | 9145551212 | 13.2 | 0.20 |

Page 2 of 20

VENDOR X

| | |
|---|---|
| ACCOUNT NAME: TELECOMMUNCATION CO | DATE DUE: May 20, 2011 |
| ACCOUNT NUMBER: ABC-12345 | AMOUNT DUE: 2302.23 |
| BILL DATE: 4/20/2011 | |

| Account Activity | |
|---|---|
| Previous Statement Balance | 2444.11 |
| Payment Received | -2244.11 |
| Adjustments to Previous Bill | -30.00 |
| Balance before Current Charges | 170.00 |
| | |
| Current Charges | 2132.23 |
| Amount Due | 2302.23 |

| Summary of Current Charges | |
|---|---|
| Late Payment Fee | 100.00 |
| Monthly Charges | 1700.00 |
| Other Charges and Credits | 300.00 |
| Usage | 10.00 |
| Taxes | 20.00 |
| Surcharges | 2.23 |
| Total Current Charges | 2132.23 |

| Payments to your Account | |
|---|---|
| 4/1/2011 Check #232 | -2244.11 |
| Total Payments | -2244.11 |

| Adjustments to your Account | |
|---|---|
| Account Credit | -30.00 |
| Total Adjustments | -30.00 |

Page 1 of 20

---

VENDOR X

ACCOUNT NAME: TELECOMMUNCATION CO
ACCOUNT NUMBER: ABC-12345
BILL DATE: 4/20/2011

2125551212
Service Address: 123 Main Street, New York, NY 10001

| Monthly Charges | | |
|---|---|---|
| Business Rate Service (VA) | | 100.00 |
| Taxes & Surcharges | | |
| Sales Tax (VST) | | 2.00 |
| Federal Surcharge (VFS) | | .03 |

2125551213
Service Address: 123 Main Street, New York, NY 10001

| Monthly Charges | | |
|---|---|---|
| Business Rate Service (VA) | | 90.00 |
| Other Charges and Credits | | |
| Installation Fee (VISNT) | | 50.00 |
| Taxes & Surcharges | | |
| Sales Tax (VST) | | 2.00 |
| Federal Surcharge (VFS) | | .03 |

— 2005

2125551214 — 2010
Service Address: 555 Peach Street, New York, NY 10009

| Monthly Charges | |
|---|---|
| Business Rate Service (VA) | 120.00 |

Usage — 2015

| Date | Time | Call to | Minutes | Amount |
|---|---|---|---|---|
| 04/18/2011 | 10:42AM | 9145551212 | 120.4 | 1.00 |
| 04/19/2011 | 10:35AM | 9145551212 | 13.2 | 0.20 |

2020

Page 2 of 20

Multiline Ex.

Vendor calls a circuit something different from the Sell
- The sell may call a given circuit 2125551212.
- The vendor may call a circuit XYZ123. Multiline will convert this to 2125551212 when running multiline on the buy.
- This will allow the buy and sell circuits to be matched by 2125551212

Multiline Table

| ban | parent_circuit | child_circuit |
|---|---|---|
| ABC12345 | 2125551212 | XYZ123 |

Multiline Ex.

Vendor may have 3 circuits that comprise an ISDN line.
The Sell has only 1 circuit that has the sell side usocs for all 3 circuits.
- The buy has three circuits 2125551212, XYZ123, XYZ456.
- The sell has only one circuit 2125551212 and has all the sell side usocs are associated to it.
- After multiline, all three circuits on the buy side will have 2125551212.
- This will allow the buy and sell circuits to be matched by 2125551212

Multiline Table

| ban | parent_circuit | child_circuit |
|---|---|---|
| ABC12345 | 2125551212 | XYZ123 |
| ABC12345 | 2125551212 | XYZ456 |

Multiline Ex.

The Telecommunications Company may want to create a special circuit to link the buy and sell
- We want to create a new circuit 2125551212 to link the buy and sell.
- The vendor circuit is BUY123
- The sell circuit is SELL123
- After multiline, the previous vendor circuit BUY123 is now 2125551212, the previous sell circuit SELL123 is now 2125551212
- This will allow the buy and sell circuit to be matched by a brand new circuit 2125551212

Multiline Table

| ban | parent_circuit | child_circuit |
|---|---|---|
| ABC12345 | 2125551212 | BUY123 |
| ABC12345 | 2125551212 | SELL123 |

2180, 2181, 2182, 2183

Tags associated to the WTN. Profitability (output 2, is a subset of these tags which are generated by the scrub process). The following are examples of tags that can be associated to a wtn when a profitability management system is implemented

2350

| Tag | Description | Source – (an example implementation) |
| --- | --- | --- |
| wtn | Circuit Identifier | Normalized Buy Side Data |
| ban | Account where this wtn can be found | Normalized Buy Side Data |
| bill_date | The date which this wtn was found | Normalized Buy Side Data |
| customer_id | The end customer identifier | Sell Side data from Indexing |
| customer_name | The end customer name | Sell Side data from Indexing |
| sell_usoc | List of sell usocs associated with this wtn | Sell Side data from Indexing |
| buy_usoc | List of buy usocs found in the vendor bill | Normalized Buy Side Data |
| expiration_date | The date when the end customer's contract expires for this wtn | Sell Side data from Indexing |
| revenue | The revenue generated by this wtn | Identified in Scrubbing 1 from Sell Side Data |
| cost | The cost associated to this wtn | Identified in Scrubbing 2 from Buy Side Data |
| profitability | (Revenue – Cost) / Revenue, Profitability Information | Identified in Scrubbing 2 |
| product_id | The product this wtn is associated to (WTN, T1, DSL, VoIP, etc.) | Identified in Scrubbing 1 from Sell Side Data |
| vendor | The vendor where this wtn is sourced | Identified via the ban. (A ban is associated to a vendor and state) |
| state | The state where this wtn is located | Identified via the ban. (A ban is associated to a vendor and state) |
| active_wtn | The wtn was found on a previous bill | Identified in Scrubbing 2 |
| profitability_increase_decrease | The amount profit has increased or decreased for this wtn compared with the previous month's bill | Identified in Scrubbing 2 |
| usocs_matched/not_matched/no t_found_count | Number of usocs matched, number of usocs not matched, number of usocs not found | Identified in Scrubbing 2 |
| claimed_amount | Amount identified to be credited by the vendor | Identified during PAP |

FIG. 23B

Phoenix

Phoenix VM Ready to Process!
Profiles | Claims | FTL | Retain | Admin | Logout

Profiles

Automated Profiles Available     Display Profiles | Display Bills in Process | Send to Production >>

- -> abovenet
- -> accelFl
- -> accelFlXl
- -> accelNy
- -> agsi
- -> americanTelesis
- -> arbinet
- -> arbinetM
- -> arbinetT
- -> att
- -> att209
- -> att8002
- -> att951
- -> attAvoics
- -> attBs
- -> attDg
- -> attMtt
- -> attUverse
- -> attWireless
- -> attbe
- -> bdt
- -> beaconSynamics
- -> bellSouth
- -> billmate
- -> billmateAscii
- -> blueTie

- -> ediSnet
- -> ediSw
- -> endStream
- -> fairpoint
- -> fairpointPdf
- -> fibernet
- -> frontier
- -> frontierBdt
- -> frontierPOS
- -> ftc
- -> global
- -> globalCrossing
- -> grande
- -> granite
- -> graniteC
- -> graniteE
- -> hargray
- -> hawaiianT
- -> iTouchPoint
- -> integra
- -> intelliverse
- -> intercall
- -> intercall2
- -> internap
- -> ipnetzone
- -> level3

- -> savvis
- -> sbc173
- -> sbc809
- -> sbcCt
- -> segway
- -> sentenia
- -> smartcd
- -> sms800
- -> spectroTel
- -> sprint
- -> sprintLd
- -> sprintText
- -> sprintWireless
- -> starnet
- -> surewest
- -> tdsTelecom
- -> telePacific
- -> telNet
- -> telx
- -> tmobile
- -> transbeam
- -> tsgGlobal
- -> twTelecom
- -> twc
- -> ucn

FIG. 24A

-> broadview
-> broadvox
-> bullsEye
-> cablevision
-> ccCommunications
-> centuryLink
-> centuryTelCBFF100
-> certainComm
-> cincinnati
-> coast2coast
-> coast2coastRim
-> coast2coastRimBi
-> coast2coastSprint
-> cogent
-> comcast
-> comcastb
-> covad
-> cox
-> dash911
-> dataView
-> eSecuritel
-> eatel
-> eba
-> ebs450
-> ebt
-> edi
-> ediBs
-> ediGl
-> ediPac -> level3978
-> masergy
-> matrix
-> mcleod
-> megapath
-> metTel
-> metcom
-> metroOptical
-> missionCritical
-> newEdge
-> nitel
-> oneCommunications
-> opus
-> pacWest
-> paetec
-> paetecTEM
-> paper
-> plateau
-> prescient
-> prs
-> ptci
-> qwest
-> qwestLocal
-> qwestNI
-> qwestPOS
-> qwestTEM
-> rainbow
-> rcnMetro
-> rgts -> verizon
-> verizonCsr
-> verizonData
-> verizonFacility
-> verizonIvr
-> verizonLd
-> verizonPOS
-> verizonPOTS
-> voipCorp
-> vz450
-> vz450x
-> vzBillManager
-> vzCsv
-> vzDSL
-> vzQuickBS
-> vzWireless
-> vzWord
-> vzWord2
-> vzX23
-> vzb21
-> vzbCanada
-> vzbMci
-> windstream
-> xit
-> xo
-> xoCd
-> xoCdData
-> zainME
-> zayo

FIG. 24B

Phoenix

2405

Phoenix VM Ready to Process!
<< Back to Home | Logout

USOC Configuration

BAN: ABC12345   Bill Date: 2011-04-20

<< Back to Current Bill | Multiline | USOCs

USOC Details

*Click to edit USOC values (Enter to save)

| USOC | Type | | | | | Description | 2415 → Sell USOC* | | Date* | USOC1 \| USOC2 \| ICB Rate 1* | |
|---|---|---|---|---|---|---|---|---|---|---|---|
| 2410 | | | | | | | | | | | |
| VA | MRC | ◁ ▷ | Ignore | | | Business Rate Service | ??? | | ??? | ??? | ⊕ |
| VFS | SUR | | | | | Federal Surcharge | ??? | | ??? | ??? | ⊕ |

Phoenix

2505

Phoenix VM Ready to Process!
<< Back to Home | Logout

USOC Configuration

BAN: ABC12345  Bill Date: 2011-04-20

<< Back to Current Bill | Multiline | USOCs

USOC Details

*Click to edit USOC values (Enter to save)

| USOC | Type | WTN | Sell USOC | | Date | USOC1 \| USOC2 \| ICB ICB Amount | |
|---|---|---|---|---|---|---|---|
| VA | MRC | 9734441234 | LINE, USF | | 2009-03-19 | 23.22 | Delete |

FIG. 25

Phoenix

Process Accounts Payable (PAP)

BAN: ABC12345    Bill Date: 2011-04-20    Invoice Number: 123-2403 _2805_

<< Back to Current Bill | Edit Catalog | ✓ PAP – Marked as Complete >> | Claim Details | GPM Vendor X Company – PA (Vendor X)    WTN that require investigation: 1    Current Charges: $1,147.92    Due Date: 2011-05-14

PAP Queue   Click to Download EXCEL

*This is a queue of items that require manual intervention. WTNs in red are WTNs that were NOT FOUND.   ↑ Bulk Upload Fixes

| WTN | ▲ USOCs | | | USOC Count | Resolved | OK? |
|---|---|---|---|---|---|---|
| 9734441209 | VA | | | 1 | 1 | ✓ ⊕ ⓘ ⓘ |

| USOC | Type | Description | Status | Billed | Configured | ICB | x Close |
|---|---|---|---|---|---|---|---|
| VA | MRC | Business Rate Service | NOT MATCHED | 120.00 | 100.00 | n/a | |

Sell USOC: LINE, USF

Comment: Contract price incorrect    Claim Amount: 20.00

Resolve: ◯ Not Resolved   ⦿ Claim   ◯ OK – One Time   ◯ OK – Add to Billing   ◯ OK – ICB
        ↳ 2810A        ↳ 2810B        ↳ 2810C        ↳ 2810D

Sell USOC (ICB): Click to Set

Phoenix VM Ready to Process!
<< Back to Home | Logout

QA: user@company.com

FIG. 28

Vendor Statistics

Cost and Revenue (from WTNs Active 2 Mths) by Vendor

This chart shows the breakdown of MRC, SUR costs and revenue by Vendor for WTNs that were active the previous and current months.

Cost, Revenue vs. Time

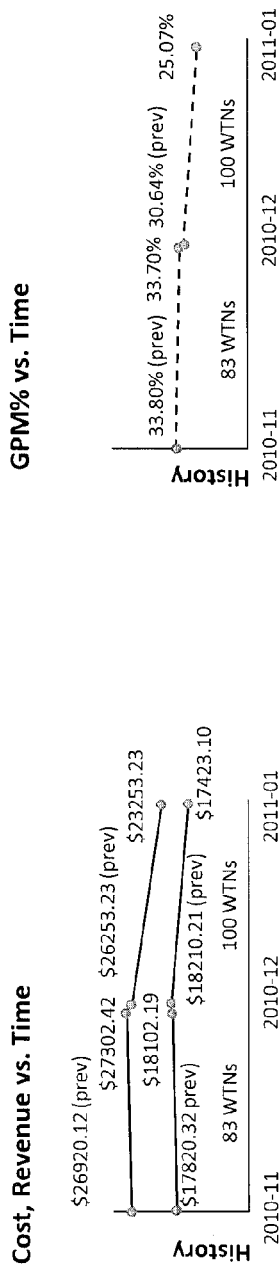

This step line graph shows the Cost and Revenue by month. For each line segment, the left dot is the previous month cost, and the right dot is the month where the comparison is being done.

GPM% vs. Time

This step line graph shows the GPM by month. For each line segment, the left dot is the previous month cost, and the right dot is the month where the comparison is being done

FIG. 30B

TELECOM PROFITABILITY MANAGEMENT

BACKGROUND

The present invention relates to the telecom industry, and more particularly, to systems and techniques for identifying the profitability of products and services.

It is difficult for a telecommunications company to identify the profitability of their products and services, since the prices from the vendors fluctuate from month to month and the pricing to the end customers of telecommunications companies fluctuate. Thus, this constant price difference between cost and revenue makes it difficult to identify profit margins.

This fluctuation can be due to many things such as, incorrect ordering of products and services by the telecommunications company, unexpected price increase by a vendor, products not disconnected by the vendor, incorrect billing by the telecommunications company to their end customer, and so forth.

Therefore, there is a need for improved systems and methods for telecom profitability management.

BRIEF SUMMARY OF THE INVENTION

A computer-implemented software application captures billing data from, e.g., telecom services, normalizes that data although it may come from disparate sources, then processes the normalized data, to calculate true profit margins, by invoice, by vendor, by geographic location (state), by customer, by circuit, or combinations of these.

In a specific implementation, a method includes a parsing and normalizing step 1, a validation step 2, and an association or mapping step 3. In step 1 the system normalizes the incoming vendor data into a common industry structure and format, using rules in a profile stored on the system.

Normalization finds key pieces of data from the files (such as, circuit, product codes, product descriptions, quantity, amounts, or dates). The profile takes advantage of the structure of vendor data. Even though the content may be received in various data formats, structured differently, this data can be parsed to identify key pieces of information. Upon a successful parse, the raw data is assigned to a common structure. During parse, the vendor data may fail for any number of reasons. The error is identified by the profile to be checked manually. The profile may be modified, or the data may be sent back to the vendor for correction.

In step 2, the data in each structure is then validated against each other. That is, after the parsed raw data is placed into the common format, the data is validated using industry specific rules stored on the system. In step 3, the system creates any required fields necessary to link the data to other data sources. For example, the system may generate key fields that can be used to associate the profiled data to other external data sources (non-vendor). Some telecommunication vendors may not provide the key fields that the profiles would need to generate. These key fields may include a circuit ID, a USOC (Universal Service Order Code), or both. The circuit ID has one to many USOCs which are the products and services associated to the circuit ID. Vendor data that does not contain USOCs are assigned a profile assigned USOC, a code used to relate the product and service to different data sets. This code can be used to uniquely identify the product or service.

BRIEF DESCRIPTION OF THE FIGURES

FIG. 9B shows an example of an input file having pdf tags that the system reads.

FIG. 9C shows an example of an output from reading the pdf tags.

FIG. 14 shows an example of the bill for creating a header model during profiling.

FIG. 15 shows an example of the bill for creating a payment and adjustment model during profiling.

FIG. 16 shows an example of the bill for creating a summary model during profiling.

FIG. 17 shows an example of the bill for creating a monthly recurring charge model during profiling.

FIG. 18 shows an example of the bill for creating an other charges and credits model during profiling.

FIG. 19 shows an example of the bill for creating a tax and surcharge model during profiling.

FIG. 20 shows an example of the bill for creating a usage model during profiling.

FIG. 21B shows a first example of multilining.

FIG. 21C shows a second example of multilining.

FIG. 21D shows a third example of multilining.

FIG. 23B shows a list of tags that may be associated to a wtn.

FIG. 24A shows a top portion of a page listing profiles.

FIG. 24B shows a bottom portion of the page shown in FIG. 24A.

FIG. 24C shows a page for configuring buy usocs to sell usocs.

FIG. 25 shows a page for overriding a usoc.

FIG. 28 shows a page for fixing fallout.

FIG. 30B shows a bottom portion of the page shown in FIG. 30A

DETAILED DESCRIPTION

Figure 1:
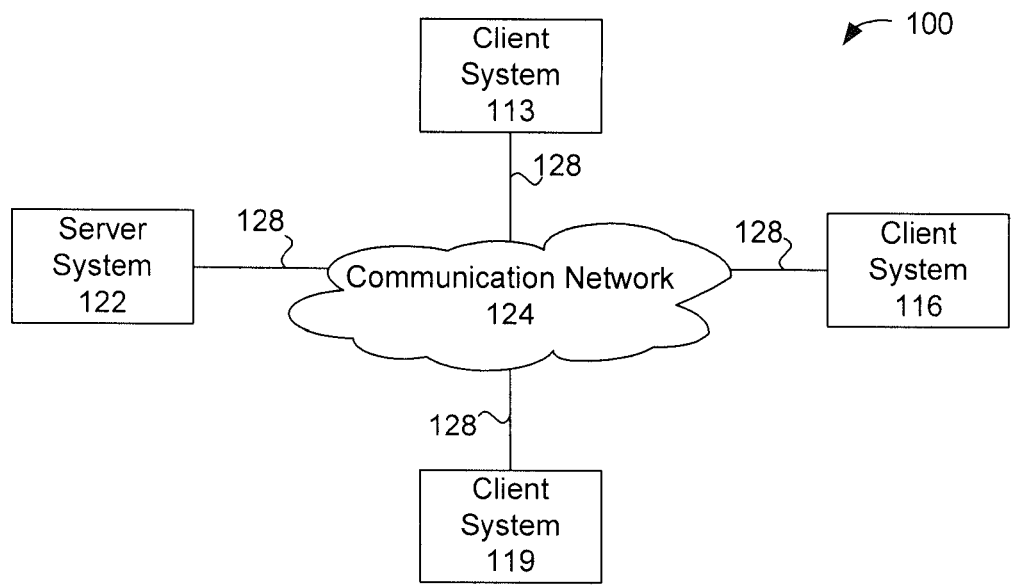
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment (e.g., software as a service (SaaS)).

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
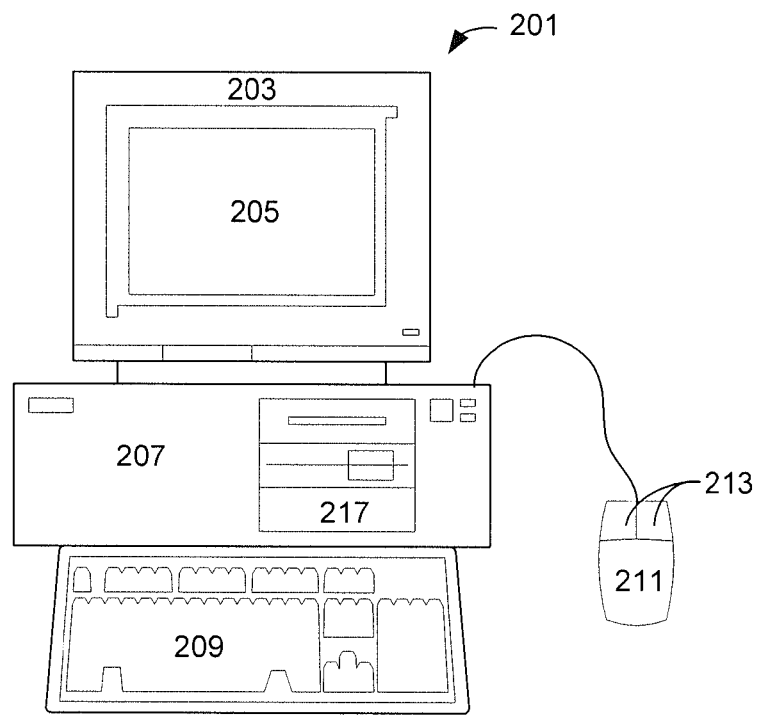
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. A client computer may be a desktop workstation such as that shown in FIG. 2 or a portable computing or electronic device such as a smartphone (e.g., iPhone), tablet device (e.g., iPad), laptop, netbook, or personal digital assistant (PDA).

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
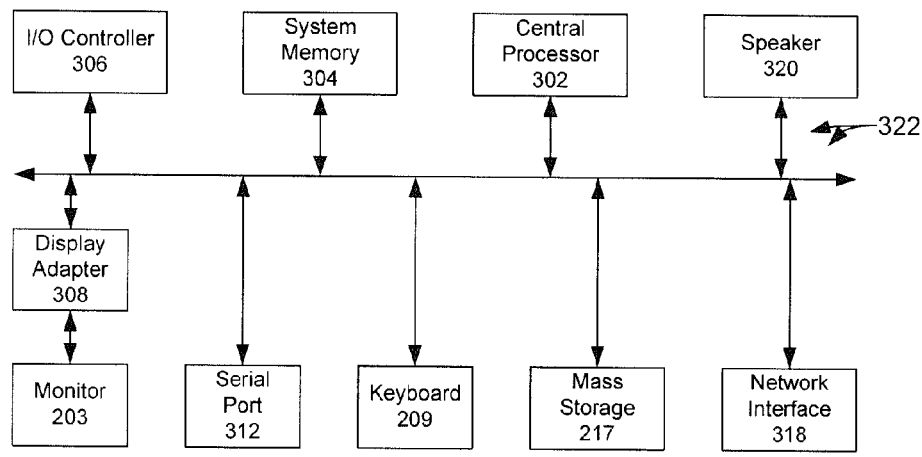
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as Ruby, Ruby on Rails, C, C++, C#, Pascal, Fortran, Perl, Matlab (from Math Works), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
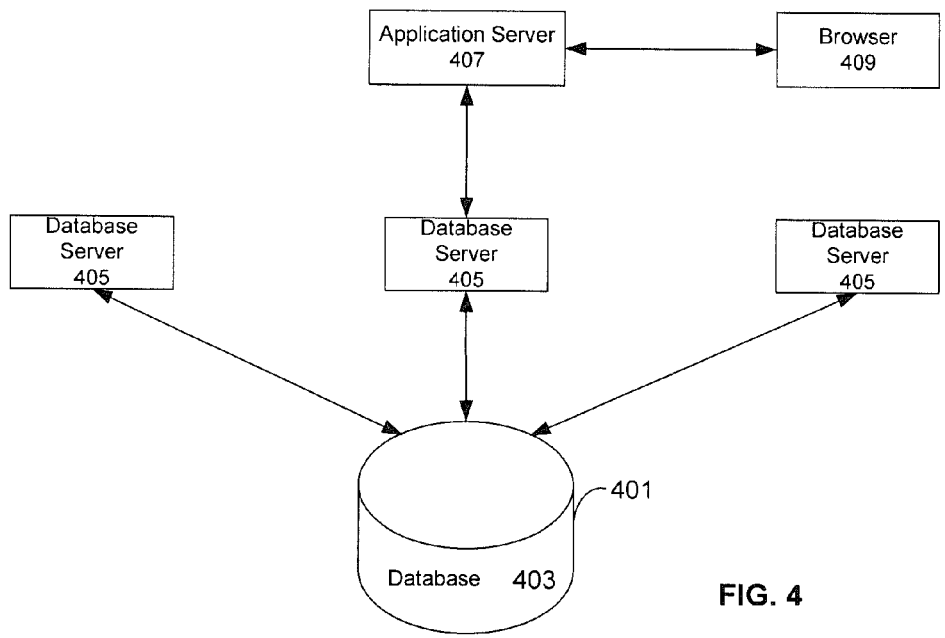
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
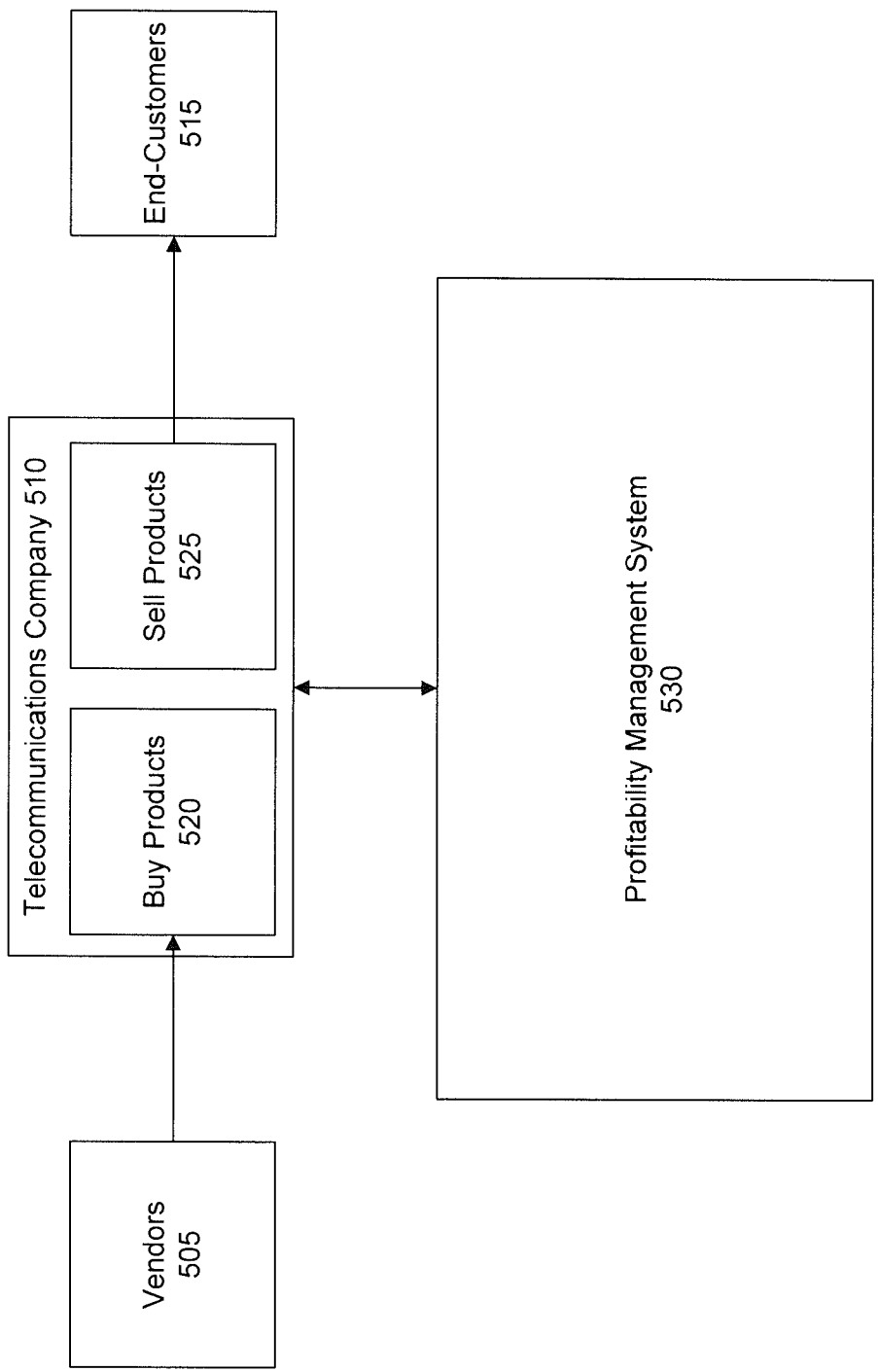
FIG. 5 shows a simplified block diagram of a profitability management system.

FIG. 5 shows a simplified block diagram in which a system of the invention may be implemented. As shown in the example of FIG. 5, there are a set of vendors 505, a telecommunications company 510, and a set of end-customers 515. The telecommunications company purchases products 520 from the vendors and resells the products 525 to the end-customers. A product may be a good such as a physical item, such as a piece of equipment (e.g., switch, router, cable box, or telephone) or a product may be a service (e.g., installation service).

A feature of the invention provides a profitability management system 530 that may be used by the telecommunications company. In an embodiment, the telecommunications company interfaces with the profitability and management system through a computer workstation system, such as shown in FIG. 2. The profitability management system captures billing data from any number of various vendors, normalizes the data although it may come from disparate sources, then processes the normalized data to calculate true profit margins.

A telecommunications company may be any company, organization, business, entity, or individual that purchases goods, services, or both with the intention of reselling them rather than consuming or using them. A telecommunications company may assemble, augment, modify, or repackage a product to suit the individual end-customer's needs. In some cases, a telecommunications company may be referred to as a value-added reseller (VAR).

A specific embodiment of the profitability and management system is directed to telecommunications companies. In this specific embodiment, the system can process bills within seconds using profiles differentiated by billing format, vendor, or both. Some of the features and benefits of the system include automatically processing incoming bills in any format (e.g., electronic, scans, or PDFs) to reduce billing errors and incorrect charges and determine whether a bill is correct, electronically verifying of the accuracy of the bill from the vendor by identifying any discrepancies before automatically posting to an accounting system, electronically reading or scanning the bills and validating line by line against what was ordered, monitoring true gross profit margins using actual billed costs versus actual revenue, reports and tools to drill down into profitability, identifying what to pay and what to claim, and helping to reduce late payment fees and helping telecommunications companies receive discounts for early payment of verified bills.

In a specific implementation, the system accepts bills in an "electronic" format. In this specific implementation, "electronic" format includes a bill in a Portable Document Format (pdf) having pdf tags. Thus, the bill includes structured data which the system can scan or read in order to accurately extract data from the bill. Some other examples of structured formats include edi, bdt, sms800, and vz450. In this specific implementation, scanned bills, i.e., scans are not considered "electronic" format and are not accepted by the system because scans may not be accurate. However, in another specific implementation, the system accepts bills in a "scanned" format.

Although a specific embodiment of the invention is directed to telecom communication companies or the telecom industry generally, the invention is also applicable to other industries including the advertising industry, information technology (IT) industry, electronics industry, computer industry, financial services industry, manufacturing industry, healthcare industry, and many others.

Figure 6:
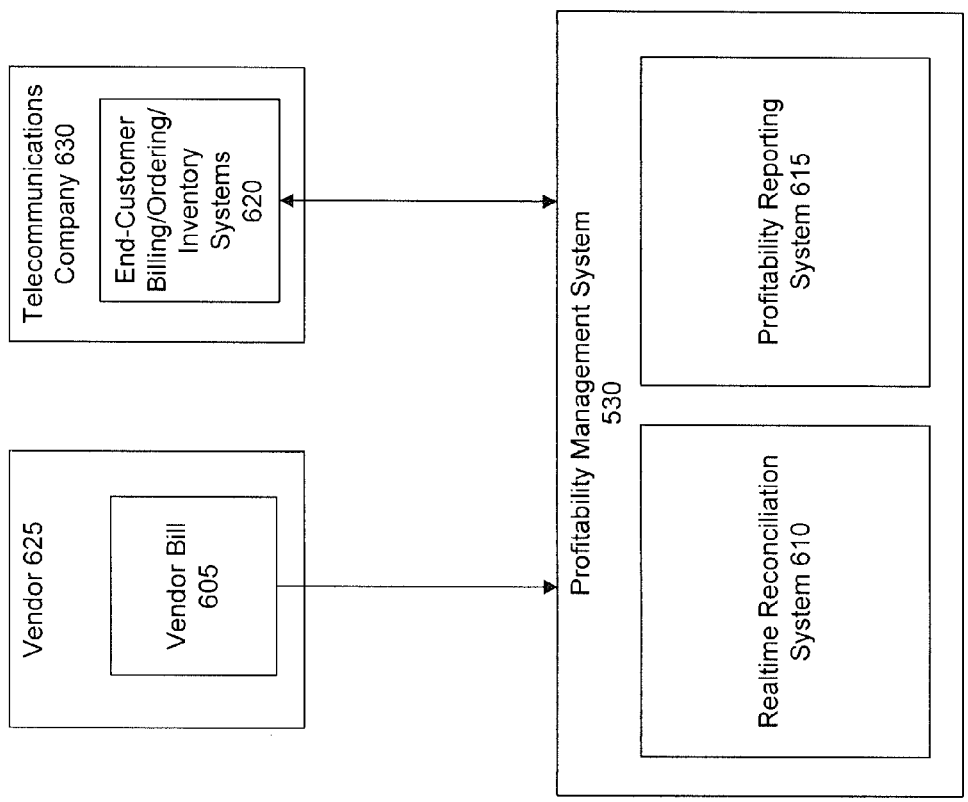
FIG. 6 shows a simplified block diagram of a vendor bill being received and processed by various components of the profitability management system.

FIG. 6 shows a simplified block diagram for receiving and processing vendor bills. A vendor bill or invoice 605 is received by system 530. The system includes several subsystems including a realtime reconciliation system 610 and a profitability and reporting system 615. System 530 may interface with a telecommunications company's end-customer billing, ordering, and inventory systems 620, such as via an application programming interface (API), to exchange information for bill reconciliation, profitability reporting, or both.

Bill 605 may be referred to as an invoice. In a specific implementation, the bill is submitted to the system by a vendor 625. In another specific implementation, the bill is submitted to the system by a telecommunications company 630.

The realtime reconciliation system checks and analyzes the bill to help ensure that there are no billing errors. Some examples of billing errors include incorrect charges for products and charges for products not ordered. These billing errors may be due to various reasons such as bill cycle differences, mistakes on ordering, or mistakes on processing. Indeed, some studies have shown that about 10 percent of bills have errors.

In a specific implementation, the realtime reconciliation system takes advantage of the commonality of telecommunication products and services being sold by vendors. A vendor may name the same product or service differently from another vendor, even if the product or service is the same. Vendor data can come in many forms (electronic pdf, txt files, EDI, CABS BDT, Verizon vz450).

In this specific implementation, a first step of the realtime reconciliation system transforms this data to a common format (normalization). Normalization allows the realtime reconciliation system to identify key pieces of data (including circuit, product codes, product descriptions, quantity, amounts, or dates). A telecommunications circuit is a conduit by which information is transmitted, and is typically denoted by a unique code, e.g., telephone number. A telephone number may be a subset of circuits. In this specific implementation, unlike other solutions which leverage OCR (Optical Character Recognition), the realtime reconciliation system reads through each file systematically via executable code (e.g., reading and analyzing pdf tags) to get good accuracy of the data (e.g., 100 percent accuracy). Good accuracy can be reached since (1) the actual pdf text is being read, and (2) The data values are compared against the overall bill. Specifically, the invoice page which has the sub totals for each section can be compared against what the realtime reconciliation system calculates by adding the charges line by line for each section.

In a step 2 the realtime reconciliation system maps the names of the products and services of the vendor to the names of the products and services that is used by the billing/ordering/inventory system 620. This can be done through methods including: (1) the realtime reconciliation system creating a logical link between the vendor product and service code, to the billing/ordering/inventory system product and service code via a "mapping" or (2) via a unique code generated by the realtime reconciliation system which gets assigned to the product or service of the vendor and the associated product or service of the billing/ordering/inventory system.

In a step 3 the realtime reconciliation system uses this normalized, mapped data to identify incorrect quantities, incorrect pricing, incorrect products and services (e.g., products and services that are not found in billing/ordering/inventory system 620).

In a step 4 the realtime reconciliation system uses the identified differences and similarities of step 3 to reconcile the data. This gives the telecommunications company the ability to:

a. Send disputes with detailed reconciliation reports to their vendors to credit their bills and invoices.

b. View profitability by vendor, product or service, by circuit, by an end-customer, or any combination of these.

c. Make a decision on end-customers nearing their contract end date to either renew, terminate, or change their contract to meet a telecommunications company's profitability targets.

The profitability and reporting system allows the telecommunications company to monitor true gross profit margins using actual billed costs versus actual revenue. True profit margins can be calculated by invoice, by vendor, by geographic location (e.g., state, region, county, zip code, city, or country), by customer, by circuit (e.g., by telephone number), or combinations of these. The reconciliation and profitability and reporting systems are further discussed later in this patent application.

Billing, ordering, and inventory systems 620 includes the telecommunications company's internal systems which have information on what products and services were ordered from vendors, and what products and services are sold to their end-customers.

Figure 7:
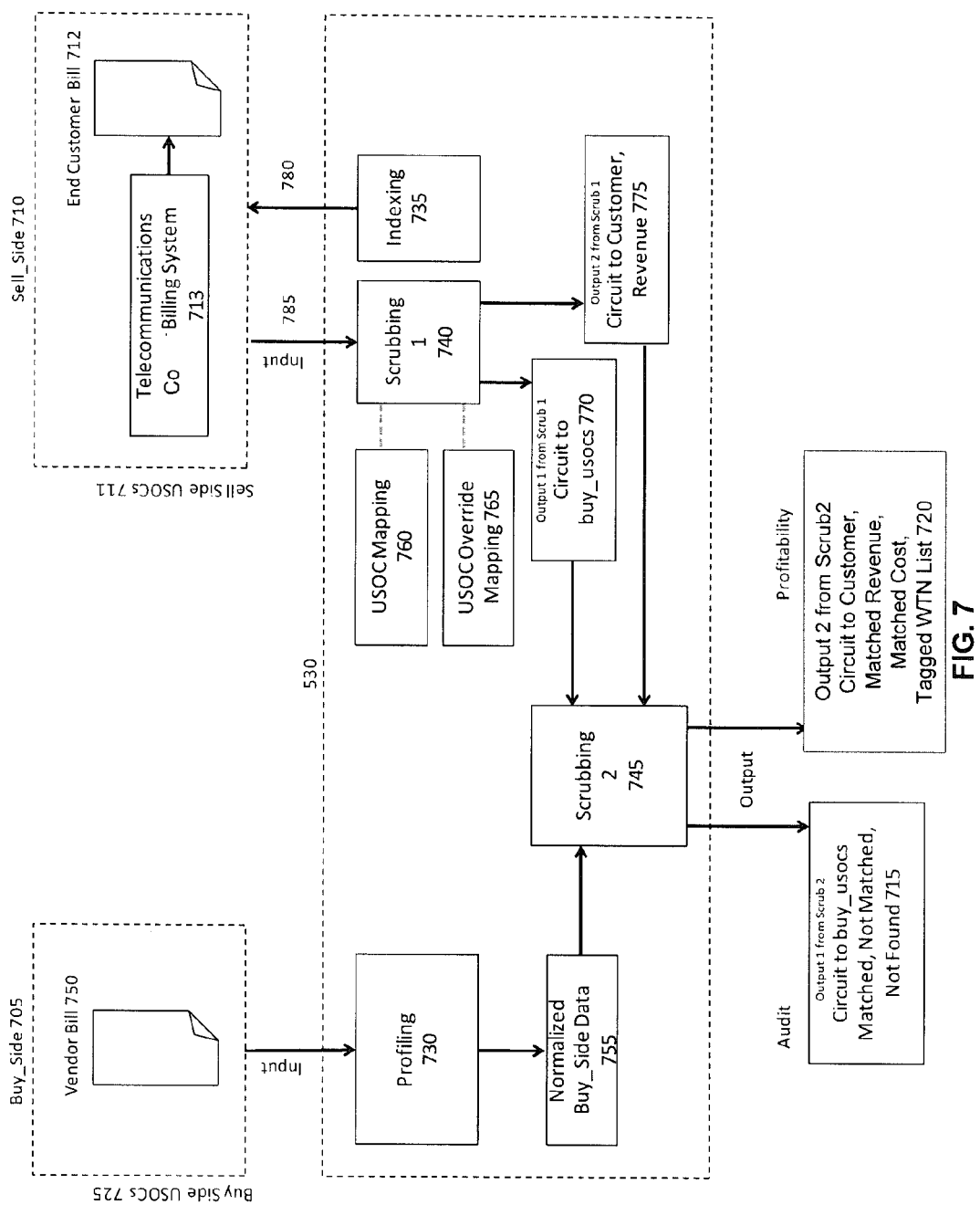
FIG. 7 shows a more detailed block diagram of the profitability management system.

FIG. 7 shows a high level process flow and is a more detailed block diagram of system 530 as shown in FIGS. 5-6. As shown in FIG. 7, there is a buy side 705, a sell side 710, and profitability and management system 530 which outputs audit information 715, profitability information 720, or both.

Buy side 705 represents products purchased by the telecommunications company from the vendor. These products may be referred to as buy side universal service order codes (USOCs) 725. USOCs are a set of codes that are used as a standard to identify services and equipment. Some examples of products that may be purchased, or can be in an invoice include call waiting (ESX), data plans (4GDATA), universal service fund (USF), wholesale minutes, voice over Internet Protocol (VoIP) services, telecom installation services, telecom equipment, usage plans, calling plans, long distance minutes, phone numbers (e.g., local numbers, toll-free numbers, mobile numbers, or land-line numbers), call-handling services, bulk short messaging service (SMS) messages, and bulk multimedia messaging service (MMS) messages—just to name a few examples.

Sell side 710 represents products that have been bought by the telecommunications company and resold by the telecommunications company to the end-customer. These products may be referred to as a sell side USOCs 711. The end-customer receives an end-customer bill 712 from a telecommunications company billing system 713 which the end-customer then pays to the telecommunications company. For example, the telecommunications company may purchase minutes in bulk from the vendor, repackage the minutes into smaller packages, and sell the packages to the end-customers.

System 530 includes several components including a profiling component 730, an indexing component 735, a first scrubbing component 740, and a second scrubbing component 745. A component may be referred as a module, engine, code component or code module. A component may represent a specific stage in the processing of a bill (e.g., profiling stage, indexing stage, or scrubbing stage).

Generally, a component receives an input, processes the input, and outputs a result. In this specific implementation, the profiling component (or stage) receives a vendor bill 750 and normalizes the data to a common industry structure and format. The output from the profiling component is a normalized buy side data 755. Indexing component 735 requests information from telecommunications company billing system 713 such as information about products resold to the end-customers (i.e., sell side USOCs 711), revenue collected from the end-customers, and so forth.

The information from indexing 735 is received by first scrubbing component 740. The first scrubbing component transforms the sell USOCs to buy USOCs using a USOC mapping subcomponent 760, a USOC override mapping subcomponent 765, or both. The first scrubbing component outputs a first output 770, a second output 775, or both. The first output includes a circuit to buy USOC result. The second output includes a circuit to customer revenue result.

Second scrubbing component takes as input normalized buy side data 755, first output 770, and second output 775 to output audit information 715, profitability information 720, or both. The audit information can indicate whether a product (e.g., USOC) on vendor bill 750 was actually purchased from the vendor at the contracted price in which case the product is indicated as "matched."

If the product was purchased from the vendor, but the amount charged by the vendor is different from the contracted price, the system identifies the product as "not matched." If the product on the bill can not be found in the telecommunications company's inventory, e.g., product was not purchased by the telecommunications company, the system identifies the product as "not found." The profitability information can indicate profitability by, for example, circuit.

In a specific implementation, the output includes a tagged working telephone number (wtn) list. In this specific implementation, a telephone number is tagged, labeled, associated, or structured with information or metadata. For example, a telephone number may be tagged with one or more tags indicating the vendor who provided the number, a geographical location (e.g., state) where the number is located, a list of sell-side products associated with the number (e.g., call waiting), a list (or corresponding list) of buy-side products associated the number, associated revenue, and associated costs—just to name a few examples. This allows for very granular reporting and breakdowns such as profitability at the number or circuit level, profitability by geographical location, and so forth. Further discussion of tags associated to the working telephone number is provided later in this application.

Figure 8:
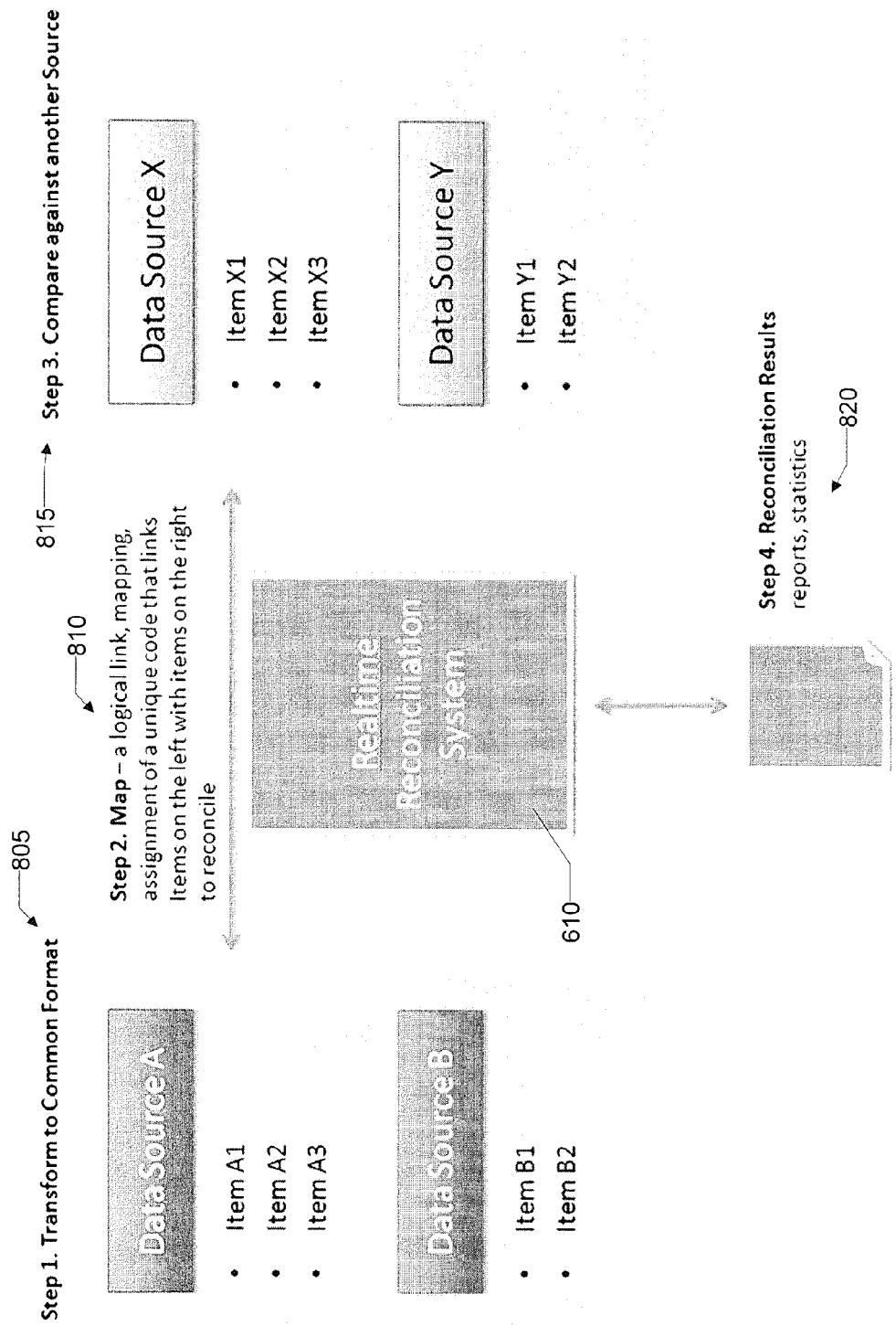
FIG. 8 shows a block diagram of a realtime reconciliation system of the profitability management system.
Figure 9A:
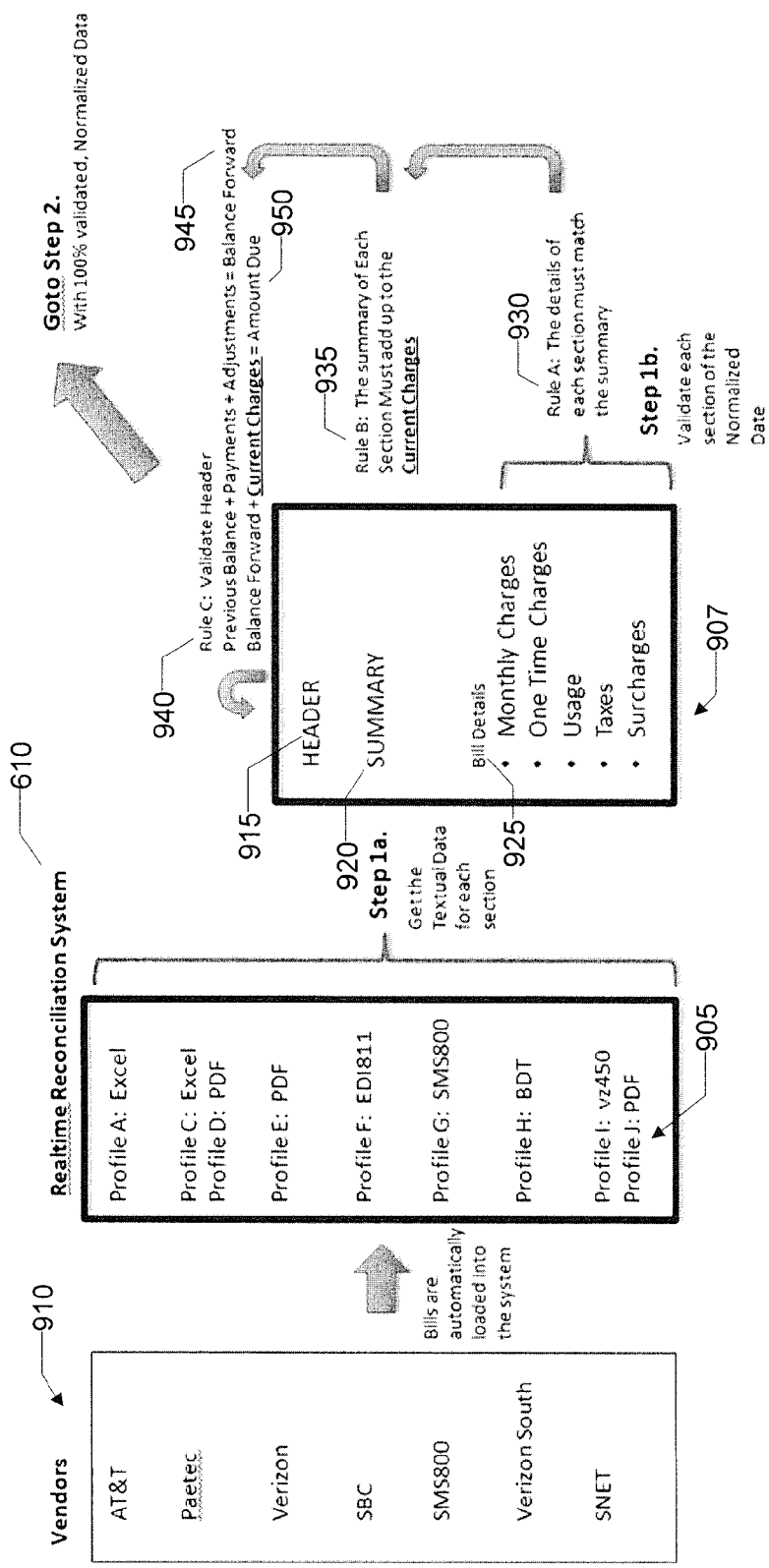
FIG. 9A shows a flow for the realtime reconciliation system.
Figure 10:
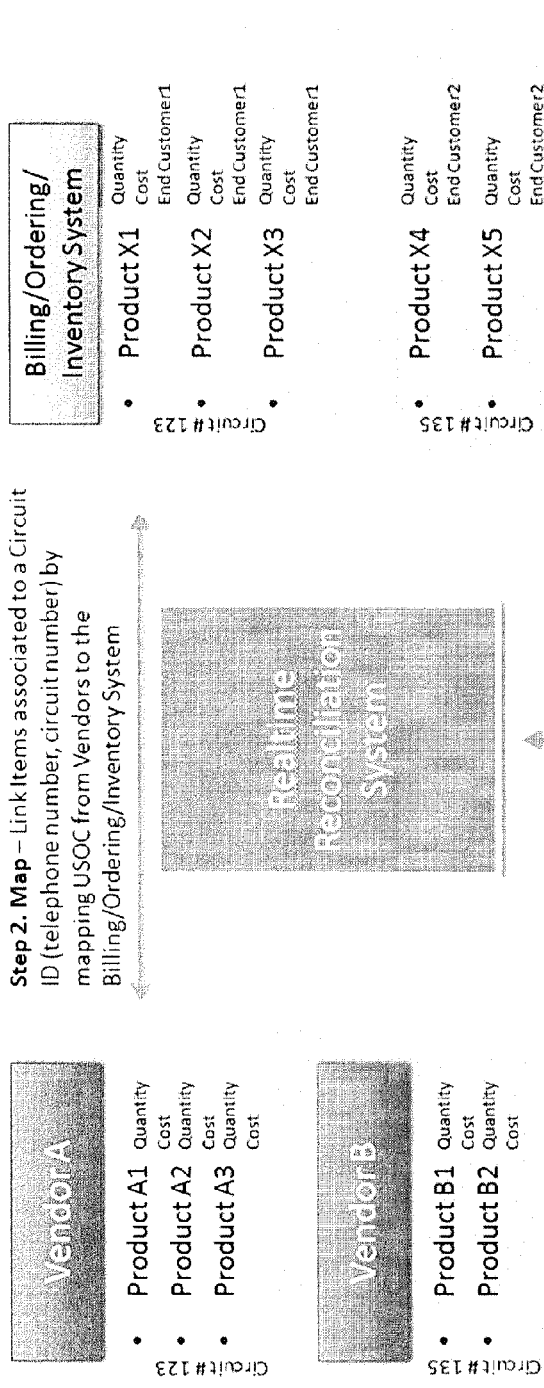
FIG. 10 shows a more detailed block diagram of the block diagram shown in FIG. 8.

FIGS. 8-10 are flow diagrams showing a technique for realtime reconciliation by reconciliation system 610 via profiling component 730 (FIG. 7). In a specific implementation, profiles breakdown invoice files, which are loaded into or otherwise transmitted to the system (e.g., pdfs). Based on the rules and algorithms of the profile, an invoice is parsed, normalized, and validated to be accurate (e.g., 100 percent accurate). Generally, all the details of the bill must sum to the amount due from the perspective of the vendor.

The realtime reconciliation system is better than what is currently available, since it focuses on circuit level detail. It can accommodate a single bill from a vendor as well as handling vendors which need to supplant their bills with additional information which contains circuit level detail.

Analyzing bills to identify circuit level detail may not be possible with a standard invoice a vendor sends to a Telecommunications Company. The profiling process is unique in that it is the first process to validate circuit level detail in its processing. For example, the input can be one or many files which are associated with a ban and a specific bill date (vendor A may send an invoice, and would also send supporting detail (circuit level detail) to support the invoice). These supporting electronic files are validated together, so that the summary information in the invoice must match the details that could be provided in the supporting detail.

Also, a vendor may have one to many different billing formats that a Telecommunications Company can receive. For example, vendor B may provide their bills in a CDROM format, or a billing data tape (bdt) format, or a pdf format. A realtime reconcliation system can combine Models from different profiles for analysis (see FIG. 11 and accompanying discussion of models). For example, a CDROM format may be used for the MRC model, and the bdt format may be used for the OCC Model, and pdfs may be used for USG. Although the invoice is the same for CDROM, bdt, pdfs, the information found in these various bill formats are different, where one bill format may have more or less circuit level information compared to the others.

Thus, in a specific implementation, profitability management system 530 (FIG. 6) receives a bill for a billing period where the bill may include or span multiple files (e.g., two or more files). For example, a first file may include billing summary information. A second file may include supporting detail. The first and second files may be in the same file format or the files may be in a different file format. That is, the first file may be in a first file format and the second file may be in a second file format, different from the first file format. The system, in conjunction with the profiles, can analyze such a bill to, for example, validate charges in the summary section with charges provided in the supporting detail section, even though the summary and supporting detail section may be in different files having the same or different file formats.

The system may receive different portions of the bill at the same time or at different times. For example, the system may receive the billing summary information and after the billing summary information is received, the system may receive the supporting detail. Alternatively, the system may receive the supporting detail and after the supporting detail is received, the system may receive the billing summary information. The system can associate the billing summary information and corresponding supporting detail by, for example, matching an identifier (e.g., account number) in the billing summary information and corresponding supporting detail.

In the event of parse, normalization, or validation failure, the automated profile flow is broken, and the bill is manually checked and missing detail may be manually added, or the profile may be updated due to a new section or pattern found in the bill, or sent back to the vendor as an incorrect bill. Subsequent automated processes take this normalized data (all invoices are converted to the same normalized format) for further processing. Since the data is at the circuit or USOC level, calculation of true profit margins by circuit is possible.

FIG. 8 shows a high-level flow of the technique. FIG. 9A shows a flow for normalizing the data during the reconciliation process. FIG. 10 shows a more detailed flow of the flow in FIG. 8. Referring now to FIG. 8, the reconciliation system receives invoices having items or products from various data sources (e.g., vendors) which the reconciliation system transforms to a common format (step 1, 805). The reconciliation system creates a logical link, mapping, and assignment of a unique code that links the items on the invoice (step 2, 810) with items from another source (step 3, 815) to reconcile. The reconciliation system can output reconciliation results (step 4, 820) which may include reports, statistics, or both.

FIG. 9A shows a more detailed flow of step 1, 805 from FIG. 8. This flow shows the automated normalization of bills and invoices. The reconciliation system includes a set of profiles 905 stored on the system which validate bills 907 received from vendors 910. A bill may include a header 915, a summary 920, and bill details 925. Bill details may identify specific charges such as monthly charges, one-time charges, usage, taxes, surcharges, or combinations of these.

Generally, the profiles are specific to a vendor and usually to a structural or file format (e.g., Microsoft Excel format or xls). So for example, Verizon the vendor can have a vz450 format, verizonPOTS, verizonPOS (which are both pdf, but from different billing formats within Verizon). In other words, two or more profiles (e.g., first and second profiles) may be specific to a vendor. However, the first profile may be used for processing bills or portions of bills having a first format. The second profile may be used for processing bills or other portions of bills having a second format, different from the first format.

A profile includes a set of parsing rules and business logic specific to a vendor or a group of vendors (e.g., two or more vendors). In a specific implementation, a profile includes a method that uses code, configuration files, manual steps, or combinations of these that are tailored to a specific vendor that allows normalization of the data to a common industry structure and format. In a specific implementation, each electronic format of the bill or invoice is loaded onto or otherwise transmitted to realtime reconciliation system 610. Each vendor may be assigned a profile. Such an assignment may be performed during a configuration or vendor set-up process.

This step of the reconciliation process normalizes the incoming vendor data into a common industry structure and format, using rules in the profile. Normalization finds key pieces of data from the billing or invoice files such as circuit, product codes, product descriptions, quantity, amounts, dates, and the like. In a specific implementation, unlike optical character recognition (OCR) systems, data retrieved from the invoice is very accurate (e.g., 100 percent accurate) because the profiles read characters in the invoice. For example, for PDFs, the system reads the post script tags to identify the actual text behind the image. By reading the actual text, and then running validation rules on the amounts, the realtime reconciliation system can validate the bill as accurate (e.g., 100 percent accurate).

FIGS. 9B-9C show an example implementation for reading pdf tags. FIG. 9B shows a portion of an electronic bill that may be received from a vendor. This bill includes pdf tags which the profiles of the system can be designed to read. For example, as shown in the figure, a reference number 970 points to a line having the characters "0-116 Td" which is the X,Y location of the string (0, 116). A reference number 975 points to a line having the characters "(ACCOUNT NAME:) 169.4625 Tj" where "Tj" identifies the string found in brackets, and its length 185.4375. Depending on the type of font being used the values in these brackets may be encoded differently and may need to be translated. This is specific from profile to profile.

FIG. 9C shows an example of the output produced from reading the portion of the electronic bill shown in FIG. 9B. Depending upon one's orientation, the data is all aligned along the X or Y axis, or the left hand side of the page. This would produce: (all aligned along the X axis, or the left hand side of the page). The output is then sent through a parsing routing to read line by line to identify patterns in the bill, which the profile uses to identify various models.

It should be appreciated that example implementation shown in FIGS. 9B-9C is merely one of many techniques that may be used to read bills or pdfs. For example, depending on the pdf generator that a vendor uses, the fonts may be decoded, since they are not ASCII. In this example, the system mimics the pdf being sent to a printer by reading the pdf tags.

A profile may include any number of rules (e.g., one, two, three, four, five, or more than five rules). A rule may be referred to as a validation rule. In the example shown in FIG. 9, there is a profile that includes a first rule 930, a second rule 935, and a third rule 940. In this specific implementation, the first rule includes a condition specifying that the details of each section in the bill details must mach the summary. The second rule includes a condition specifying that the summary of each section must add up to the bill "current charges." The third rule validates the header by specifying two conditions that should be satisfied. A first condition 945 specifies that "previous balance" plus "payments" plus "adjustments" should equal "balance forward." A second condition 950 specifies that "balance forward" plus "current charges" should equal "amount due." Table A below shows some examples of rules that may be included in a profile to validate a bill.

TABLE A

| Rule Number | Description | Condition |
| --- | --- | --- |
| Rule 1 | Header check | previous_balance + payments + adjustments == balance_forward |
| Rule 2 | Header check (part 2) | balance_forward + current_charges == amount_due |
| Rule 3 | Summary check | sum of the data in Summary (MRC, OCC, Usage, Tax, Surcharge) == current_charges |
| Rule 4 | Details: Adjustments | sum of the data == adjustments in Header |

TABLE A-continued

| Rule Number | Description | Condition |
|---|---|---|
| Rule 5 | Details: Payments | sum of the data == payments in Header |
| Rule 6 | Details: MRC | sum of the data == MRC in Summary |
| Rule 7 | Details: OCC | sum of the data == OCC in Summary |
| Rule 8 | Details: Usage | sum of the data == Usage in Summary |
| Rule 9 | Details: Tax | sum of the data == Tax in Summary |
| Rule 10 | Details: Surcharge | sum of the data == Surcharge in Summary |

There can be any number of profiles stored on the system, such as a 5, 10, 15, 20, 30, 40, 50, or more than 50 stored profiles. In a specific implementation, the profile is created before the bill is transmitted to the system. For example, there can be a manual process to analyze a particular vendors bill to identify, for example, vendor-specific information such as terms, formatting, styles, layouts, and arrangements that the vendor may use on a bill. Based on this vendor-specific information, a profile is created. In another specific implementation, the profile is created after the bill is transmitted to the system. There may be a case where a bill is submitted to the system, but the system does not have a profile corresponding to the vendor. For example, the vendor may be a new vendor. Thus, in this specific implementation, the system may return an error, alert, or notification that a profile should be created for this vendor.

Figure 11:
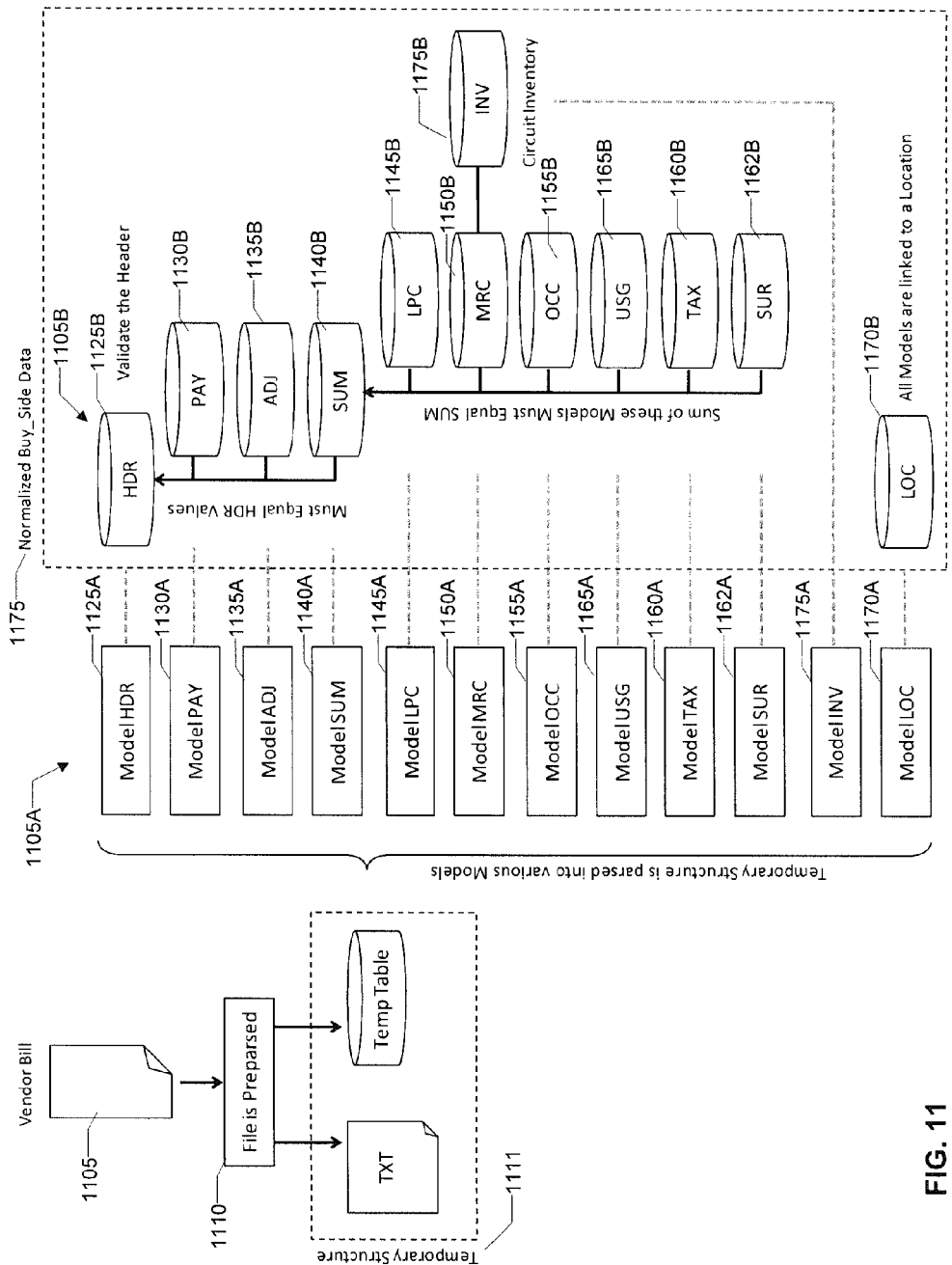
FIG. 11 shows a flow for profiling.

FIG. 11 shows a detailed block diagram of system 530 subcomponents for profiling and, specifically, "buy side" parsing, normalizing, and validation. The figure shows a vendor bill 1105 being received and parsed 1110 via a profile. Billing data is extracted from the vendor bill and placed in a temporary structure 1111. The temporary structure is parsed into a set of models 1115A. The models correspond to a set of tables 1120B (e.g., database tables) which store the captured billing data specified by the model.

As shown in FIG. 11, there is a header model 1125A and a corresponding header table 1125B. A payment model 1130A and a corresponding payment table 1130B. An adjustment model 1135A and a corresponding adjustment table 1135B. A summary model 1140A and a corresponding summary table 1140B. A late payment charge model 1145A and a corresponding late payment charge table 1145B. A monthly recurring charge model 1150A and a corresponding monthly recurring charge table 1150B. An other charges and credits model 1155A and a corresponding other charges and credits model table 1155B. A tax model 1160A and a corresponding tax model table 1160B. A surcharge model 1162A and a corresponding tax and surcharge model table 1162B. A usage model 1165A and a corresponding usage model table 1165B. A location model 1170A and a corresponding location model table 1170B. An inventory model 1175A and a corresponding inventory model table 1175B.

Table B below provides a flow outline of steps for profiling. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

TABLE B

| Step | Description |
|---|---|
| 1180 | Receive bill (1105) |
| 1181 | Preparse bill using profile (1110) and place bill data into temporary structure (1111) |
| 1182 | Parse temporary structure into various sections according to set of models (1105A) |
| 1183 | Create header model (HDR) (1125A, 1125B) |
| 1184 | Create payment model (PAY) (1130A, 1130B) |
| 1185 | Create adjustment model (ADJ) (1135A, 1135B) |
| 1186 | Create summary model (SUM) (1140A, 1140B) |
| 1187 | Create late payment charge model (LPC) (1145A, 1145B) |
| 1188 | Create monthly recurring charge model (MRC) (1150A, 1150B) |
| 1189 | Create other charges and credits model (OCC) (1155A, 1155B) |
| 1190 | Create tax and surcharge models (TAX and SUR) (1160A, 1160B and 1162A and 1163B) |
| 1191 | Create usage model (USG) (1165A, 1165B) |
| 1192 | Create location model (LOC) (1170A, 1170B) |
| 1193 | Create inventory model (INV) (1175A, 1175B) |

More specifically, in step 1180 the system receives bill 1105 as an electronic file. In a specific implementation, the bill is received as an electronic PDF file, not a scanned PDF. In other words, the bill is received as a PDF file having PDF tags rather then being received as a PDF file having an image. Receiving the bill as a PDF file having PDF tags can allow the bill data to be more accurately analyzed as compared to optical character recognition (OCR) techniques.

For example, OCR techniques can have difficulty recognizing characters because of the variety of different font types, font sizes, layouts, formatting, and the like that a bill may have. Thus, this specific implementation does not use an OCR technique. Rather, this specific implementation includes a method for reading through each file systematically via executable code (for example reading and analyzing PDF tags) to get good accuracy (e.g., 100 percent accuracy) of the data. Good accuracy can be reached since the actual text is being read, not "guessed," and the data extracted is verified against a set of industry structures.

More particularly, the rules in the profile can validate this extracted data. The rules in the profile can follow industry standards/structures. For example, typically, a telecom bill includes the sections Monthly Recurring Charges, Other Charges and Credits, Surcharges, Taxes, Usage, Adjustments, and Payments. However each bill may be presented differently by a Vendor. The profiles reconcile this by normalizing them back to the basic building blocks of a telecommunication bill.

In another specific implementation, the bill is received as an image or scanned PDF. For example, some vendors may not know how to create a PDF file having PDF tags. Thus, the system is flexible such that bills can be received as scanned images and OCR techniques will be used to recognize and identify the billing data.

The bill may be received using any suitable technique such as via file transfer protocol (FTP), uploading, shared drive, or web upload to the associated profile. There may be graphical user interface (GUI) having a browse button to select and upload the electronic bill file to the system, billing data may be received via an application programming interface (API) provided by the system, a bill may be e-mailed to the system as an attachment to an e-mail, or combinations of these. In a specific implementation, the vendor submits the bill directly to the system. In another specific implementation, the vendor provides the bill to the telecommunications company and the telecommunications company submits the bill to the system.

In step 1181, the bill is preparsed by the profile and bill data is placed into a temporary structure. Determining what profile to use to analyze the bill may rely on data external to the bill, data internal to the bill, or both. For example, in a specific implementation, the profile is selected upon upload, i.e., when the bill is uploaded to the system. For example, as part of the bill upload process there may be a GUI having a set of profiles and a set of radio buttons or a drop-down list to select a specific profile based on the specific vendor. In another specific implementation, a vendor may place via FTP, the bill into a folder specifically assigned to the vendor.

In another specific implementation, the profile is automatically selected based on information in the bill. For example, the bill may include information identifying the vendor such as the vendor's company name. In this specific implementation, after the bill has been submitted to the system, the system reads the vendor company name and selects the appropriate profile that is assigned to the vendor based on the vendor company name.

In a specific implementation, if the bill is received as an electronic PDF file, it is transformed into a temporary structure (e.g., plain text format, preserving the layout of the file). The post script tags may be read to construct a text output that preserves the layout. Bills may be in a two or more column format, in which case the temporary structure is reconstructed page by page. For example, a page that has two columns of data is split into two pages, the first page is the left column, and the second page is the right column. This allows the parsing to go from the first page to the last page in a logical sequence. If the bill is received in another electronic format, different from the PDF format, the bill is read into a temporary structure (e.g., memory, txt file, database).

Thus, in a specific implementation, a bill is transformed into a temporary structure regardless of whether the bill is an electronic PDF format or some other electronic format. In this specific implementation, if a bill follows a documented format, the profile is created to match the documentation. The bill itself is some textual format. This textual format can be a fix fielded format, a dynamic fielded format. The bill is transformed from this textual format to a database table format, so the text file is broken down to the individual components as defined in the Vendor documentation. The profile then reads these individual components to normalize for further processing.

A bill may include several sections such as a header, summary, adjustments detail, payments detail, late payment charges detail, monthly recurring charges detail, one-time charges and credits detail, usage detail, tax detail, surcharges detail, or combinations of these. These sections may be linked by the billing account number assigned by the vendor, and the bill date.

The header section may include basic invoice information, billing account number, billing date, due date, adjustments, payments, current charges, and amount due. The summary section summarizes the details of the bill. The details can be used to validate the details and the current charges. The adjustments detail section may include details on the adjustments made. The payments detail section may include payments that were made.

The late payment charges detail section may include fees for late payments. The monthly recurring charges detail section (MRC) may include details of the monthly recurring charges. The one-time charges and credits detail section (OCC) may include one time charges and credits. The usage detail section may include usage sensitive data, calls made, data packets sent, and so forth. The tax detail section may include taxes that were charged. The surcharges detail section may include surcharges that were charged.

Figure 12:
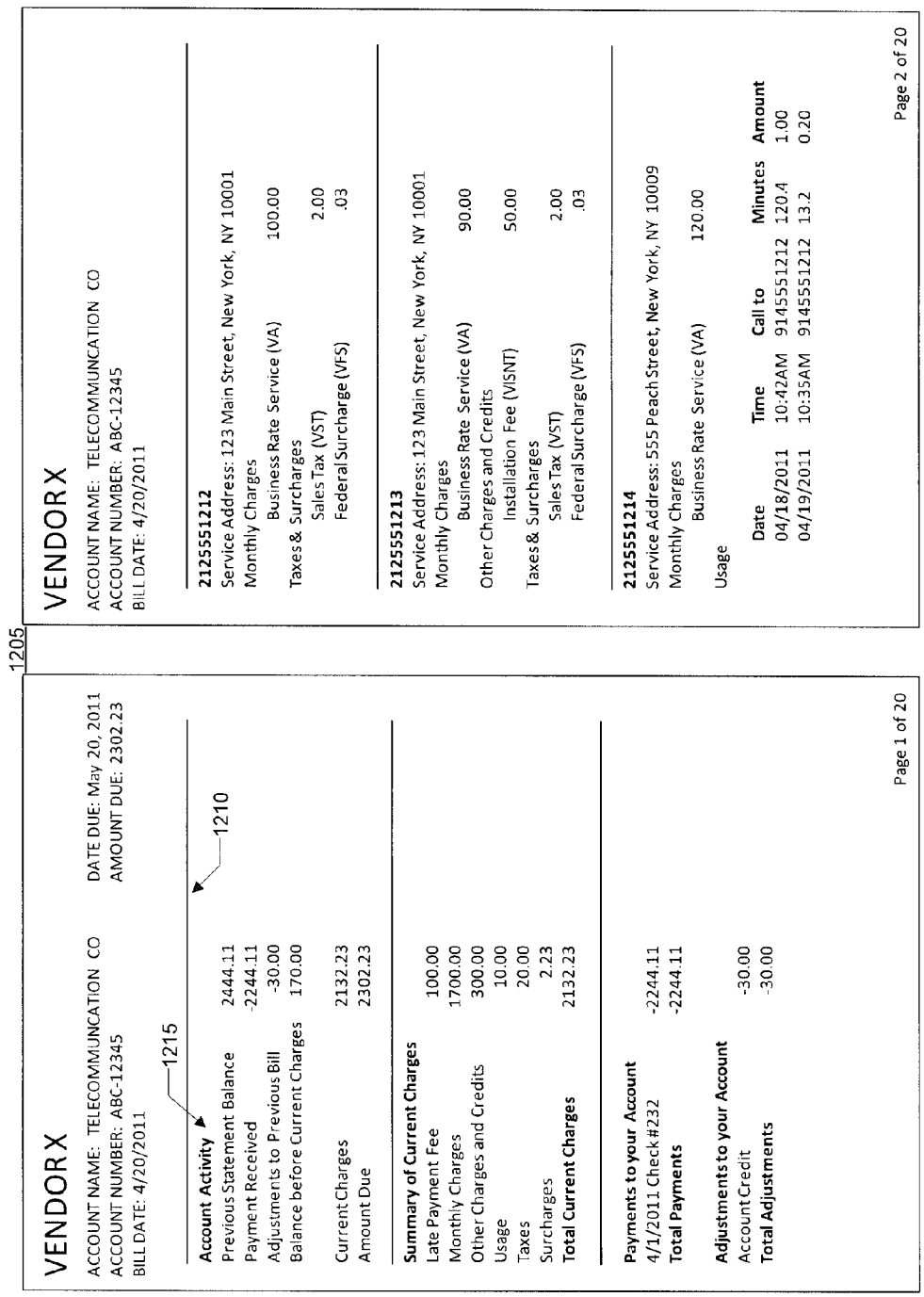
FIG. 12 shows an example of a bill before preparse during profiling.
Figure 13:
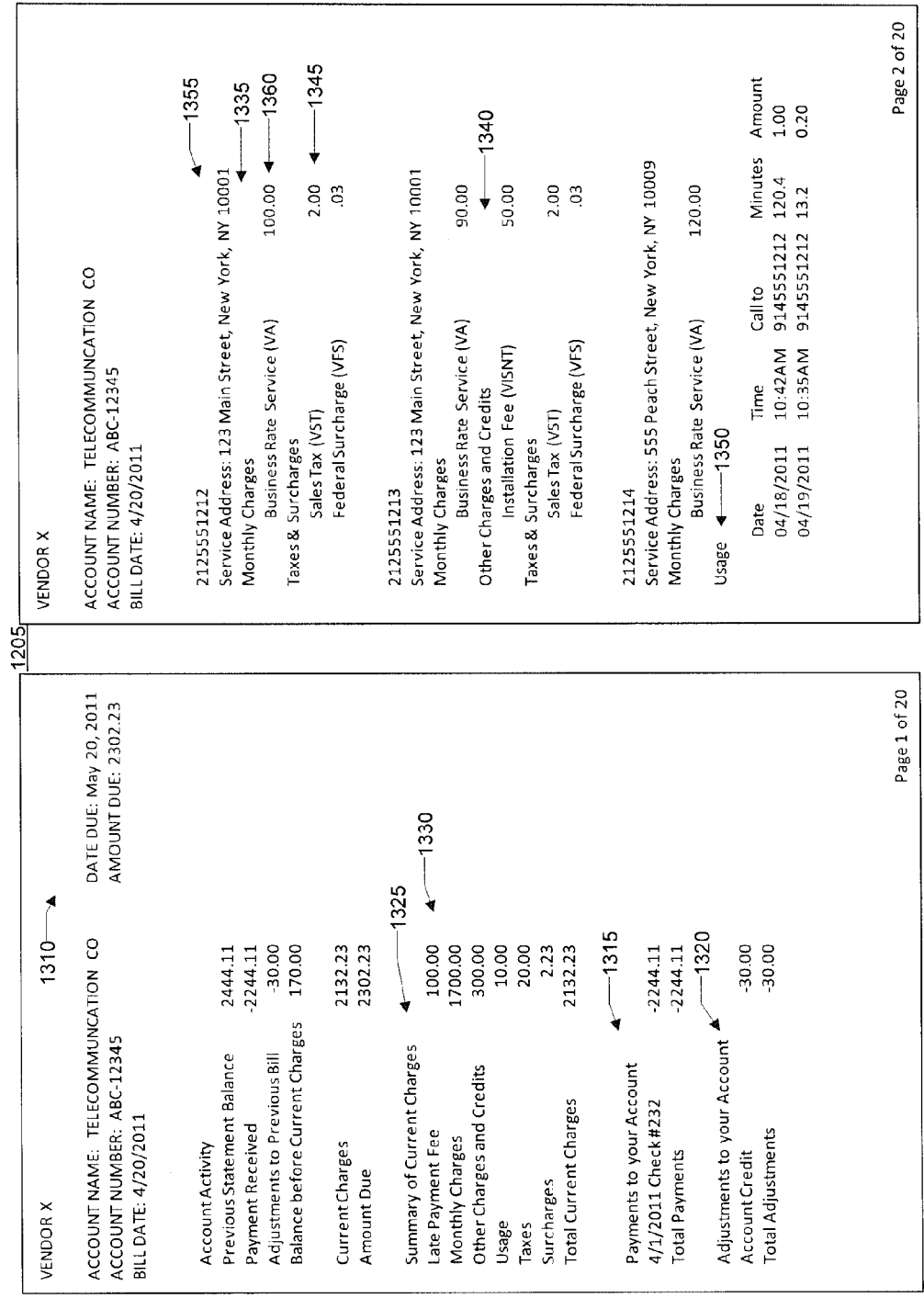
FIG. 13 shows an example of the bill after preparse during profiling.

As an example, FIG. 12 shows an example of a portion of a bill 1205 (e.g., PDF bill) before profiling preparse. FIG. 13 shows an example of the bill after preparse. The figures show the first two pages of the bill. The remaining pages of the bill have been omitted for clarity. Referring now to FIG. 12, this bill includes various formatting such as lines 1210 and bold formatting 1215. As shown in FIG. 13, the preparsing step strips or removes the formatting. The system extracts the billing data and places the extracted data into the temporary structure.

In step 1182, the temporary structure of the bill is parsed into various sections according to set of models 1105A. A set of parsing and validation routines specific to a vendor are run to break out and identify the details of a bill. A detail can include the supporting description of an amount used in the calculation of the "current charges" of a bill such as at the circuit or USOC level). In a specific implementation, if the bill is received as an electronic PDF file, each line of the bill in the temporary structure is read to be processed. If the bill is in another electronic format, the temporary structure is read to be processed. These formats typically match directly to a model of the system. More particularly, in this specific implementation, for a PDF, the pdf is transformed to a pure text format which the profile uses as input to normalize. This pure text file is the "temporary structure." The pure text file is the exact pdf, with images, borders, etc. removed. The profile parses this line by line based on patterns. For example, MRCs could be identified for a bill if they begin with a line having the characters, words, or phrase "Monthly Recurring Charges" and end with "Total Monthly Recurring Charges." If they are in another electronic format, the profile follows the structure as defined by the Vendor. The bill may have sections which can be associated with the system models (e.g., MRC, OCC, SUR, TAX, ADJ, PAY, and USG).

As shown in FIG. 13, this bill includes a header section 1310, a payments section 1315, an adjustments section 1320, a summary section 1325, a late payment charge section 1330 in the summary section, a monthly recurring charge section 1335, an other charges and credits section 1340, a tax and surcharge section 1345, a usage section 1350, a location section 1355, and an inventory section 1360 in the monthly recurring charge section.

FIGS. 14-20 show the details of the various sections of bill 1205 being extracted or captured to create the models. Underlining is used in the figures to highlight the specific bill details being captured to create the specific model. In particular, FIG. 14 shows an example for creating the header model 1183 from header section 1310. The figure shows the header being pulled from a PDF based profile for a vendor named "X." In a specific implementation, the invoice page of the bill is identified and fields specified by the model are captured. These fields may be referred to as required fields.

In a specific implementation, a method for retrieving values or capturing the data includes reading a line of a bill and determining if a sequence of characters in the line matches a predetermined sequence of characters associated, where the predetermined sequence of characters is associated with a detail identifier. If the sequence of characters matches the predetermined sequence of characters, reading a next sequence of characters, and assigning the detail identifier to the next sequence of characters.

Using the bill as shown in FIG. 14 as an example, the system reads in each line and if it matches what the vendor calls "ACCOUNT NUMBER:", then the values immediately following the "ACCOUNT NUMBER:" is retrieved and saved as the vendor account number (ban). That is, the detail identifier "ban" is assigned the values immediately following the "ACCOUNT NUMBER:." The system finishes the header creation process after it reaches and processes "Amount Due" in this example. Table C below shows an example of some of the header details stored in header table 1125B as a result of reading the header section.

TABLE C

| Detail Identifier | Value Assigned |
| --- | --- |
| ban | "ABC12345" (bans are stripped of special characters) |
| bill_date | "2011-04-20" (dates are transformed into the same format) |
| due_date | "2011-05-20" |
| amount_due | "2302.23" |
| previous_balance | "2444.11" |
| payments | "−2244.11" |
| adjustments | "−30.00" |
| balance_forward | "170.00" |
| current_charges | "2132.23" |
| amount_due | "2302.23" |

As discussed, a profile includes an algorithm or instruction for reading the bill details and assigning the appropriate bill detail identifier. The profiles may be specific to a particular vendor because each vendor may label or identify bill details or fields differently from another vendor. For example, vendor A may use the abbreviation "ACCT NO." to identify the account number but vendor B may use the full spelling, e.g. "ACCOUNT NUMBER" to identify the account number. Thus, a profile associated with vendor A will include instructions to find a sequence of characters including "ACCT NO." A profile associated with vendor B will include instructions to find a different sequence of characters including "ACCOUNT NUMBER."

Further, each vendor may position, arrange, layout the bill details differently from another vendor. For example, vendor A may position the account number value to be on the same line as the label "ACCOUNT NUMBER" and immediately following the label when reading from left to right. Alternatively, vendor B may position the account number value to be on a line different from the line having the label "ACCOUNT NUMBER." For example, the value may be on a line below the line having the label. The value may be on a line above the line having the label. The value and label may be on the same line, but the value may appear before the label when reading from left to right. Thus, the instructions included in each profile may be customized to accommodate these differences in labeling and positioning.

If the system is unable to read the bill an alert, notification, or other indication is generated so that a user, i.e., a human, can intervene. The indication may be an e-mail message, text message, an alert icon that is displayed on a bill profiling summary screen, or combinations of these. For example, a vendor may update or change their bill format by moving the account number value to be on a line below the account number label. In this case, the system may be unable to find the account number value because the account number value and account number label are no longer on the same line. Thus, the system generates a notification so that the user can intervene. The profile may be updated such that the system will look for the account number value in a line below the line having the account number label.

FIG. 15 shows an example for creating the payment and adjustment models 1184, 1185 from payment and adjustment sections 1315 and 1320, respectively. The figure shows an example of a payment detail being pulled from a PDF based profile for a vendor X. Payment details are identified from a payments section. In a specific implementation, if a vendor does not provide separate payment details, an entry is generated from the payment amount found in the header.

A technique used to create the payment model may be similar to the technique used to create the header model discussed above. In particular, in a specific implementation, the system identifies the payment detail section when it matches on "Payment to your Account" and stops gathering Payment details when it matches on "Total Payments." Table D below shows an example of some of the information stored for the payment model.

TABLE D

| Detail Identifier | Value Assigned |
| --- | --- |
| ban | "ABC12345" (may be required and taken from header) |
| bill_date | "2011-04-20" (may be required and taken from header) |
| description | "4/12011 Check #232" |
| amount | "−2244.11" |

FIG. 15 further shows an example of an adjustment detail being pulled from a PDF based profile for a vendor X. Adjustment details are identified from an adjustment section. In a specific implementation, if a vendor does not provide separate adjustment details, an entry is generated from the adjustment amount found in the header. Again, a technique used to create the adjustment model may be similar to the technique used to create the header model discussed above. In particular, in a specific implementation, the system identifies the adjustment detail section when it matches on "Adjustments to your Account" and stops gathering adjustment details when it matches on "Total Adjustments." Table E below shows an example of some of the information stored for the adjustment model.

TABLE E

| Detail Identifier | Value Assigned |
| --- | --- |
| ban | "ABC12345" (may be required and taken from header) |
| bill_date | "2011-04-20" (may be required and taken from header) |
| description | "Account Credit" |
| amount | "−30.00" |

FIG. 16 shows an example for creating the summary model 1186. The figure is an example of summary detail 1325 being pulled from a PDF based profile for a vendor X. Some vendor bills include a "rollup" section or a summary section that summarizes the various models to the "current charges" in the header model (HDR). In a specific implementation, this process assigns summary details with a model code (e.g., MRC, OCC, USG, TAX, SUR, or LPC). At a later step, this information is used to validate the amounts captured in the various models to identify where there may be a billing error. For example, if the summary section has MRC totaling to 20.00, the sum of all MRC details should equal to 20.00. Validation is further discussed later in this application.

A technique used to create the summary model may be similar to the technique used to create the header model discussed above. In particular, in a specific implementation, the system identifies the summary section when it matches on "Summary of Current Charges" and stops gathering details when it matches on "Total Current Charges." This example of the summary section includes six details: (1) late payment fee (first detail), (2) monthly charges (second detail), (3) other charges and credits (third detail), (4) usage (fourth detail), (5) taxes (fifth detail), and (6) surcharges (sixth detail). Tables F-K show examples of some of the information stored for the summary model.

TABLE F (first detail)

| Detail Identifier | Value Assigned |
|---|---|
| ban | "ABC12345" (may be required and taken from header) |
| bill_date | "2011-04-20" (may be required and taken from header) |
| description | "Late Payment Fee" |
| charge_type | "LPC" (based on matching on "Late Payment") |
| amount | "100.00" |

In a specific implementation, if the late payment charge details can be identified in a separate late payment charge section, they are taken and put into the late payment charge model. The bill in FIG. 16 is an example late payment charge being generated from the summary for a PDF based profile for a vendor X. This bill is an example where details are not available for the model. In other words, this example of the bill does not have a separate late payment charge section. Therefore, the late payment charge detail is generated from the summary.

TABLE G (second detail)

| Detail Identifier | Value Assigned |
|---|---|
| ban | "ABC12345" (may be required and taken from header) |
| bill_date | "2011-04-20" (may be required and taken from header) |
| description | "Monthly Charges" |
| charge_type | "MRC" (based on matching on "Monthly Charges") |
| amount | "1700.00" |

TABLE H (third detail)

| Detail Identifier | Value Assigned |
|---|---|
| ban | "ABC12345" (may be required and taken from header) |
| bill_date | "2011-04-20" (may be required and taken from header) |
| description | "Other Charges and Credits" |
| charge_type | "OCC" (based on matching on "Other Charges") |
| amount | "300.00" |

TABLE I (fourth detail)

| Detail Identifier | Value Assigned |
|---|---|
| ban | "ABC12345" (may be required and taken from header) |
| bill_date | "2011-04-20" (may be required and taken from header) |
| description | "Usage" |
| charge_type | "USG" (based on matching on "Usage") |
| amount | "10.00" |

TABLE J (fifth detail)

| Detail Identifier | Value Assigned |
|---|---|
| ban | "ABC12345" (may be required and taken from header) |
| bill_date | "2011-04-20" (may be required and taken from header) |
| description | "Taxes" |
| charge_type | "TAX" (based on matching on "Taxes") |
| amount | "20.00" |

TABLE K (six detail)

| Detail Identifier | Value Assigned |
|---|---|
| ban | "ABC12345" (may be required and taken from header) |
| bill_date | "2011-04-20" (may be required and taken from header) |
| description | "Surcharges" |
| charge_type | "SUR" (based on matching on "Surcharges") |
| amount | "2.23" |

FIG. 17 shows an example for creating the monthly recurring charge model 1188. The figure is an example of MRC detail being pulled from a PDF based profile for a vendor X. The MRC is identified and its details are pulled into the monthly recurring charges model. A technique used to create the monthly recurring charge model may be similar to the technique used to create the header model discussed above.

In particular, using the bill shown in FIG. 17, the system identifies that a MRC section may exist if it finds a line 1705 that has only 10 digits in the line. When the profile finds a line that has 10 digits—it stores it as the circuit number. When a subsequent line 1710 matches "Service Address:" then it stores this line as a location associated to the circuit number. When a subsequent line 1715 matches "Monthly Charges" then the details following will be stored to the MRC model, until a line is reached that has no "amount" at which point the circuit number is reset to NULL and the location is reset to NULL.

In this specific implementation, this method or pattern is repeated, and in this example three MRC detail lines are identified by the profile for this vendor. When a location that was previously identified is found again, the same "location_id" is given for that line. This location information may be used by all models. The location model (LOC) can associate bill details to a particular location. This becomes another way to group the bill details.

This example of the MRC section includes three details, each detail corresponding to a particular location. Tables L-N show examples of some of the information stored for the MRC model.

TABLE L (first detail)

| Detail Identifier | Value Assigned |
|---|---|
| ban | "ABC12345" (may be required and taken from header) |
| bill_date | "2011-04-20" (may be required and taken from header) |
| location_id | "1" (location 123 Main Street, New York, NY 10001) |
| wtn (working telephone | "2125551212" |

TABLE L-continued (first detail)

| Detail Identifier | Value Assigned |
|---|---|
| number) | |
| quantity | "1" |
| description | "Business Rate Service" |
| usoc | "VA" (Taken from the value found in the parenthesis) |
| amount | "100.00" |

TABLE M (second detail)

| Detail Identifier | Value Assigned |
|---|---|
| ban | "ABC12345" (may be required and taken from header) |
| bill_date | "2011-04-20" (may be required and taken from header) |
| location_id | "1" (the same location 123 Main Street, New York, NY 10001) |
| wtn | "2125551213" |
| quantity | "1" |
| description | "Business Rate Service" |
| usoc | "VA" (Taken from the value found in the parenthesis) |
| amount | "90.00" |

TABLE N (third detail)

| Detail Identifier | Value Assigned |
|---|---|
| ban | "ABC12345" (may be required and taken from header) |
| bill_date | "2011-04-20" (may be required and taken from header) |
| location_id | "2" (location 555 Peach Street, New York, NY 10009) |
| wtn | "2125551214" |
| quantity | "1" |
| description | "Business Rate Service" |
| usoc | "VA" (Taken from the value found in the parenthesis) |
| amount | "120.00" |

FIG. 18 shows an example for creating the other charges and credit model 1189. The figure is an example of OCC detail being pulled from a PDF based profile for a vendor X. The OCC is identified and its details are pulled into the other charges and credits model. A technique used to create the other charges and credits model may be similar to the technique used to create the header model discussed above.

In particular, using the bill shown in FIG. 18 as an example, the system identifies that a OCC section may exist if it finds a line 1805 that has only 10 digits in the line. When it finds a line that has 10 digits—it stores it as the circuit number. When a subsequent line 1810 matches "Service Address:" then it stores this line as a location associated to the circuit number. When a subsequent line 1815 matches "Other Charges and Credits" then the details following will be stored to the OCC model, until a line is reached that has no "amount" at which point the circuit number is reset to NULL and the location is reset to NULL. In a specific implementation, this method or pattern is repeated, and in this example one OCC detail line is identified by the profile for this vendor. Table O below shows an example of some of the information stored for the other charges and credit model.

TABLE O (first detail)

| Detail Identifier | Value Assigned |
|---|---|
| ban | "ABC12345" (may be required and taken from header) |
| bill_date | "2011-04-20" (may be required and taken from header) |
| location_id | "1" (since 123 Main Street, New York, NY 10001 was previously matched) |
| wtn | "2125551213" |
| quantity | "1" |
| description | "Installation Fee" |
| usoc | "VINST" (Taken from the value found in the parenthesis) |
| amount | "50.00" |

FIG. 19 shows an example of creating the taxes and surcharges model 1190. The figure is an example of tax and surcharge detail being pulled from a PDF based profile for a vendor X. The tax and surcharges are identified and its details are pulled into the TAX or SUR Model. A technique used to create the taxes and surcharges models may be similar to the technique used to create the header model discussed above.

In particular, in a specific implementation, the system identifies that a TAX section may exist if it finds a line 1905 that has only 10 digits in the line. When it finds a line that has 10 digits—it stores it as the circuit number. When a subsequent line 1910 matches "Service Address:" then it stores this line as a location associated to the circuit number. When a subsequent line 1915 matches "Taxes & Surcharges" then the details 1920 following will be stored to the TAX Model if the detail matches "Tax" else it will be stored to the SUR Model (1925) until a line is reached that has no "amount" at which point the circuit number is reset to NULL and the location is reset to NULL. In a specific implementation, this method or pattern is repeated. In this example two tax detail lines and two surcharge detail lines are identified by the profile for this vendor. Tables P-S show examples of some of the information stored for the taxes and surcharges models.

TABLE P (first detail in TAX)

| Detail Identifier | Value Assigned |
|---|---|
| ban | "ABC12345" (may be required and taken from header) |
| bill_date | "2011-04-20" (may be required and taken from header) |
| location_id | "1" (since 123 Main Street, New York, NY 10001 was previously matched) |
| wtn | "2125551212" |
| quantity | "1" |
| description | "Sales Tax" |
| usoc | "VST" |
| amount | "2.00" |

TABLE Q (first detail in SUR)

| Detail Identifier | Value Assigned |
|---|---|
| ban | "ABC12345" (may be required and taken from header) |
| bill_date | "2011-04-20" (may be required and taken from header) |
| location_id | "1" (since 123 Main Street, New York, NY 10001 was previously matched) |

TABLE Q-continued (first detail in SUR)

| Detail Identifier | Value Assigned |
|---|---|
| wtn | "2125551212" |
| quantity | "1" |
| description | "Federal Surcharge" |
| usoc | "VFS" |
| amount | ".03" |

TABLE R (second detail in TAX)

| Detail Identifier | Value Assigned |
|---|---|
| ban | "ABC12345" (may be required and taken from header) |
| bill_date | "2011-04-20" (may be required and taken from header) |
| location_id | "1" (since 123 Main Street, New York, NY 10001 was previously matched) |
| wtn | "2125551213" |
| quantity | "1" |
| description | "Sales Tax" |
| usoc | "VST" |
| amount | "2.00" |

TABLE S (second detail in SUR)

| Detail Identifier | Value Assigned |
|---|---|
| ban | "ABC12345" (may be required and taken from header) |
| bill_date | "2011-04-20" (may be required and taken from header) |
| location_id | "1" (since 123 Main Street, New York, NY 10001 was previously matched) |
| wtn | "2125551213" |
| quantity | "1" |
| description | "Federal Surcharge" |
| usoc | "VFS" |
| amount | ".03" |

FIG. 20 shows an example of creating the usage model 1191. The figure is an example of usage detail being pulled from a PDF based profile for a vendor X. The usages are identified and its details are pulled into the USG Model. A technique used to create the usage model may be similar to the technique used to create the header model discussed above.

In particular, in a specific implementation, the system identifies that a USG section may exist if it finds a line 2005 that has only 10 digits in the line. When it finds a line that has 10 digits—it stores it as the circuit number. When a subsequent line 2010 matches "Service Address:" then it stores this line as a location associated to the circuit number (FIG. 10.2). When a subsequent line 2015 matches "Usage" then the details following will be stored to the USG Model if they contain an amount. These detail lines can be further parsed.

In a specific implementation, a method to get additional information is to split the line when the profile finds a space in the line. In this example a line 2020 would be converted to an array of 5 elements, where the first two elements combined would be the description, the third element would be the called_to_wtn, the fourth element would be the quantity, and the last element would be the amount. In this example, there are two detail lines. Tables T and U below show examples of some of the information stored for the usage model.

TABLE T (first detail)

| Detail Identifier | Value Assigned |
|---|---|
| ban | "ABC12345" (may be required and taken from header) |
| bill_date | "2011-04-20" (may be required and taken from header) |
| location_id | "2" |
| wtn | "2125551214" |
| called_to_wtn | "9145551212" |
| quantity | "120.4" |
| quantity_type | "Minutes" (This profile for vendor X would be minutes since vendor X sells local minutes.) |
| description | "04/18/2011 10:42AM" |
| usoc | "Local" (In this example Vendor X sells local minutes. Therefore the Profile would assign all USG "Local") |
| amount | "1.00" |

TABLE U (second detail)

| Detail Identifier | Value Assigned |
|---|---|
| ban | "ABC12345" (may be required and taken from header) |
| bill_date | "2011-04-20" (may be required and taken from header) |
| location_id | "2" |
| wtn | "2125551214" |
| called_to_wtn | "9145551212" |
| quantity | "13.2" |
| quantity_type | "Minutes" |
| description | "04/19/2011 10:35AM 9145551212" |
| usoc | "Local" |
| amount | "1.00" |

In step 1192 the location model data is created in (MRC, OCC, TAX, SUR, USG) or is otherwise associated with or linked to models MRC, OCC, TAX, SUR, and USG. In a specific implementation, the location model is created after the other models have been created or have been processed. The location model can be created, since all the other models have been processed.

In this specific implementation, the location_id and the address information that was captured is now saved in the Location Model. In the example of the bill shown in FIG. 17, the profile has identified two locations. Tables V and W below show examples of some of the information stored for the location model.

TABLE V (first location)

| Detail Identifier | Value Assigned |
|---|---|
| ban | "ABC12345" (may be required and taken from header) |
| bill_date | "2011-04-20" (may be required and taken from header) |
| location_id | "1" |
| address | "123 Main Street, New York, NY 10001" |

TABLE W (second location)

| Detail Identifier | Value Assigned |
|---|---|
| ban | "ABC12345" (may be required and taken from header) |
| bill_date | "2011-04-20" (may be required and taken from header) |

TABLE W-continued (second location)

| Detail Identifier | Value Assigned |
|---|---|
| location_id | "2" |
| address | "555 Peach Street, New York, NY 10009" |

In step 1193 the inventory model is generated from the MRC. In this step, the MRC model is read and the profile attempts to identify what kind or type of line it is. In this example of the bill shown in FIG. 17, the profile identifies three lines with a class of service of "POTS" with a sub class of "Message Rate."

In a specific implementation, the system includes a class of service table which identifies classes of services based on rules specific to each profile. Table X below shows an example of a class of service table based off of usoc or usoc_desc.

TABLE X

| ban | usoc or usoc description | Class of Service |
|---|---|---|
| ABC12345 | VA | POTS |
| ABC12345 | "Data Services" | ISDN |
| ABC12345 | "T1 Services" | T1 |

If the input file is in a telecommunications electronic data format, there are documented set of rules which can be used to define the system class of service table. If the input is undocumented, such as a PDF, as each bill fails for an inventory match, the new detail is analyzed and added to the system class of service table, such that subsequent bills will map to the correct class of service and sub class. The telecommunications company can use this model to quickly identify the types of lines, by product (class of service) they are being invoiced. Generally, class of service is synonymous to a product line (for example POTS—plain old telephone service, DSL, etc.). The profile can identify a product type for each circuit using this technique.

Referring now to FIG. 11, once all the models are populated, the normalized buy side data 1175 is validated. In a specific implementation, the system validates using the normalized data: (1) the header, (2) header to summary, (3) that details match the summary, and (4) that locations are populated for all details. If the system detects any discrepancies, these discrepancies may be flagged so that they can be further checked.

Header model 1125A is validated to make sure the values are correct. In a specific implementation, the header model validation includes two conditions to be satisfied for the validation. A first condition specifies: previous_balance+payments+adjustments must equal balance_forward. A second condition specifies: balance_forward+current_charges must equal amount_due. The profile fails the bill if the validation should fail.

In a specific implementation, the validate header to summary includes three conditions to be satisfied. A first condition specifies: current_charges found in HDR model 1125A is validated against the sum of the summary model amounts (see 1130A, 1135A, and 1140A). They should equal. A second condition specifies the payment details stored in PAY model 1130A must equal the payments in the HDR. A third condition specifies: the adjustment details stored in ADJ model 1135A must equal the adjustments in the HDR. The profile fails the bill if the validation should fail.

In a specific implementation, to validate that the details match the SUM, the details stored in the following models LPC 1145A, MRC 1150A, OCC 1155A, USG 1165A, TAX 1160A, and SUR 1162A are validated against the summary. The profile fails the bill if the validation should fail.

Thus, a technique to validate a bill may include extracting a first portion of bill data, extracting a second portion of bill data, performing a mathematical operation between the first and second portions to generate a result, and comparing the result with a third portion of the bill data.

In a specific implementation, to validate locations are populated for all detail (see 1170A), the details in all the models are checked to make sure each detail item has a location associated to it. Since profiles grab, obtain, or extract details from various sections, a location could have been missed and a detail may not have been associated to a location. That is, the algorithm that was used may have failed. For example, the location data can be on the last page of the bill—and it could list a set of circuits (TNs) and their associated locations. However this list may not contain a circuit that was found in the bill on the previous pages/sections. In this case the profile fails the bill. At this point validation is complete and the data is normalized (e.g., tagged/placed into their various sections/models).

Figure 21A:
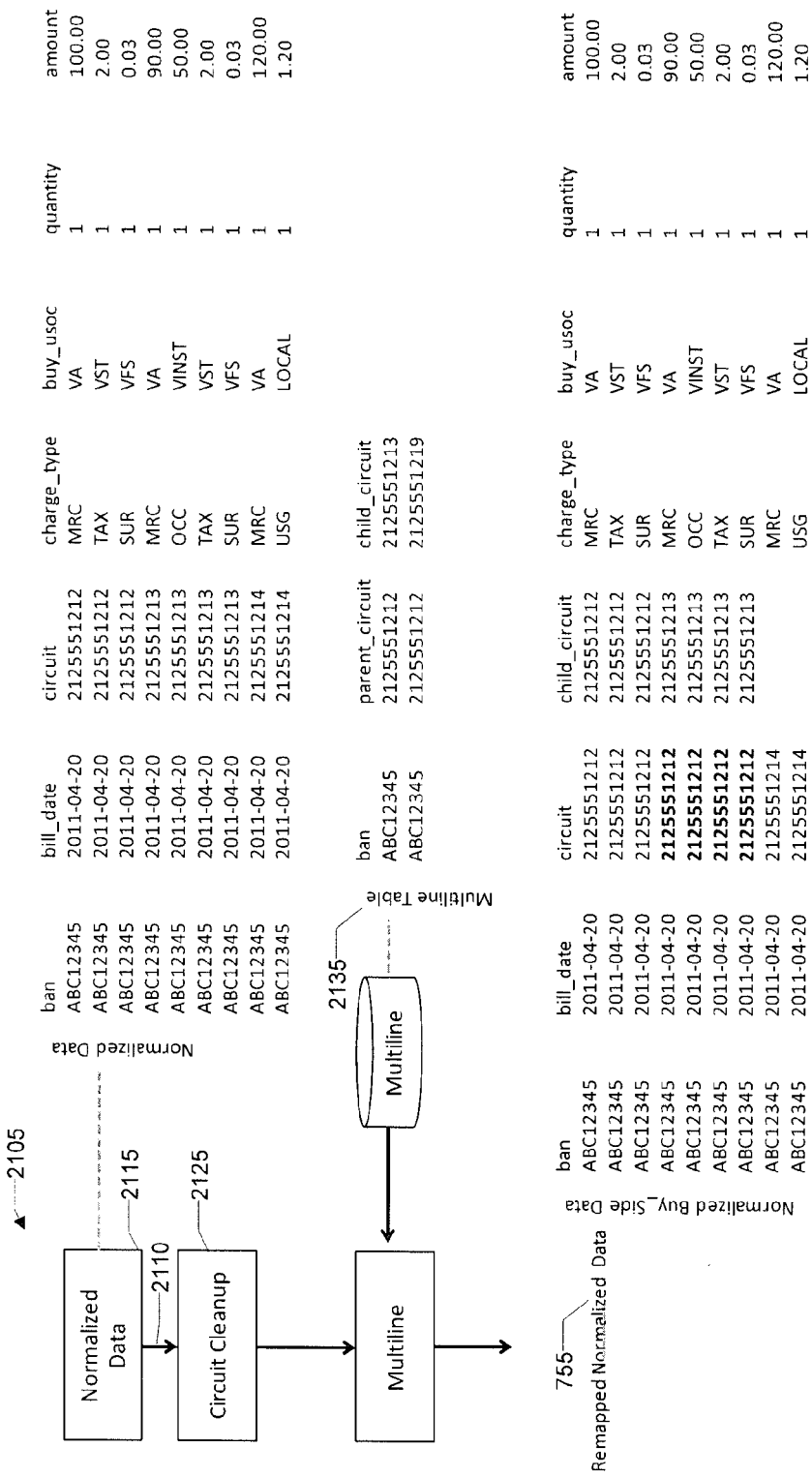
FIG. 21A shows a flow for circuit cleanup and multiline functionality during profiling.

FIG. 21A shows a flow diagram 2105 for restructuring the normalized data in order for further processing to occur. In brief, in a step 2110, normalized data 2115 is input to a circuit cleanup component or stage 2120. The output from the circuit cleanup may be provided to a multiline component or stage 2125. The output from the multiline component includes normalized buy side data 755 which may be referred to as remapped normalized data. That is, the "normalized buy side data" is after circuit clean up and multiline.

For example a telecommunications company may call or label a circuit "32HXXX176543NY." A vendor may call the same circuit "32.HXXX.176543 . . . NY." In order for the normalized data to be used for profit margin calculation, it is desirable that the circuits be in the same format. The circuit cleanup component includes circuit cleanup rules which are specific to a profile, since one vendor may format the circuit value differently than another vendor. With the circuit cleanup component, the circuits can be formatted the same way between the vendor and the telecommunications company.

Regarding the multiline component, circuits can have a parent child relationship. For example, an end-customer, such as a business, may have many different lines or telephone numbers for each of their employees. However this parent child relationship may be different between the vendor and the telecommunications company. Some examples include: trunks, ISDN lines, Hunt Groups, DID Lines, and others. Also, the revenue may be associated to the parent TN (i.e., telephone number), it is desirable that the children of the parent TN be associated to parent for vendor and the telecommunications company. Without multilining, there would be cases where usocs would inaccurately fall-out. Multiline is used when a vendor (buy side) assigns circuits that are not the same as the sell side. By multilining the circuits, both the buy and sell can be compared using the parent TN.

The multiline component or functionality includes a table 2135 that maps the relationship between a parent TN and its child TNs that allows for this relationship to be created. In a specific implementation, this relationship is unique by ban (vendor account number or billing account number).

Remapped normalized data 755 is an example of the transformed data. Since the multiline table has 2125551213 mapped to the parent 2125551212, the costs, and the usocs associated with 2125551213 can be included with the parent 2125551212, making further processing possible.

FIGS. 21B-21D show some examples where multilining is used to facilitate comparing the buy side with the sell side using the parent telephone number. In the example shown in FIG. 21B, there is a multiline table 2160 having the columns "ban," "parent_circuit," and "child_circuit." In this example, a vendor calls a circuit something different from the sell. The sell may call a given circuit "2125551212." The vendor may call a circuit "XYZ123." Multiline will convert this to "2125551212" when running multiline on the buy. This will allow the buy and sell circuits to be matched by "2125551212."

More particularly, in a specific implementation, there is a first circuit 2161 and a second circuit 2162, different from the first circuit. The first circuit identifies a product when purchased from a vendor. The first circuit may be referred to as the buy. The first circuit represents a buy-side usoc. The second circuit identifies the product, i.e., the same product, when sold to an end-customer. The second circuit may be referred to as the sell. The second circuit represents a sell-side usoc. The first circuit is mapped to the second circuit. For example, a record in a table may have a first field storing an account number, a second field storing the second circuit, and a third field storing the first circuit.

FIG. 21C shows an example of a multiline table 2170 used to facilitate comparisons when two or more products purchased from a vendor have been combined into a single product sold to an end-customer. In this example, a vendor may have 3 circuits that comprise an ISDN line. The Sell has only 1 circuit that has the sell side usocs for all 3 circuits. The buy has three circuits "2125551212," "XYZ123," and "XYZ456." The sell has only one circuit "2125551212" and has all the sell side usocs are associated to it. After multiline, all three circuits on the buy side will have "2125551212." This will allow the buy and sell circuits to be matched by "2125551212."

More particularly, in a specific implementation, there is a first circuit 2171, second circuit 2172, third circuit 2773, and a fourth circuit 2174. The first circuit is different from the second and third circuits. The second circuit is different from the third circuit. The first circuit and fourth circuit are the same. The first circuit identifies a first product when purchased from a vendor. The second circuit identifies a second product when purchased from the vendor. The third circuit identifies a third product when purchased from the vendor. The first, second, and third circuits may be referred to as the buy. The first circuit represents a first buy-side usoc. The second circuit represents a second buy-side usoc. The third circuit represents a third buy-side usoc.

The fourth circuit may be referred to as the sell. The fourth circuit represents a single sell-side usoc that includes the first, second, and third buy-side usocs. The first, second, and third circuits are mapped to the fourth circuit. For example, a first record in a table may have a first field storing an account number, a second field storing the first circuit, and a third field storing the second circuit. A second record in the table may have a first field storing the account number, a second field storing the fourth circuit, and a third field storing the third circuit.

FIG. 21D shows an example of a multiline table 2180 used to facilitate comparisons by creating a new circuit. In this example, a telecommunications company may want to create a special circuit to link the buy and sell. The system creates or facilitates the creation of a new circuit "2125551212" to link the buy and sell. The vendor circuit is "BUY123." The sell circuit is "SELL123." After multiline, the previous vendor circuit "BUY123" is now "2125551212," the previous sell circuit "SELL123" is now "2125551212." This will allow the buy and sell circuit to be matched by a brand new circuit "2125551212."

More particularly, in a specific implementation, there is a first circuit 2181 and a second circuit 2182, different from the first circuit. The first circuit identifies a product when purchased from a vendor. The first circuit may be referred to as the buy. The first circuit represents a buy-side usoc. The second circuit identifies the product, i.e., the same product, when sold to an end-customer. The second circuit may be referred to as the sell. The second circuit represents a sell-side usoc. A new circuit 2183 is created. The new circuit is different from the first and second circuits. The first circuit is mapped to the new circuit. The second circuit is mapped to the new circuit. For example, a first record in a table may have a first field storing an account number, a second field storing the new circuit, and a third field storing the first circuit. A second record in the table may have a first field storing the account number, a second field storing the new circuit, and a third field storing the second circuit.

The mapping of buy-side circuits to sell-circuits may be manual, automated, or may involve a combination of manual and automated techniques. In a specific implementation, the system provides a graphical user interface (GUI) which displays (e.g., on an electronic screen) a buy-side circuit and an input box for a user to enter a sell-side circuit to be mapped to the buy-side circuit. In another specific implementation, the GUI displays a sell-side circuit and an input box for the user to enter a buy-side circuit to be mapped to the sell-side circuit. There can be a new button for the user to create a new circuit that maps to a sell-side and a buy-side circuit. There can be multiple input boxes so that multiple buy-side products or usocs can be mapped to a single sell-side product or usoc.

More particularly, in a specific implementation, there is an initial configuration or setup that is performed where a user provides a mapping or logical linking between the buy and sell. In this specific implementation, the first time a bill is processed, the system identifies all the usocs that need to be mapped. A mapper (person or user who is in charge of the tariffs) inputs or types in the sell side usocs for each of the buy side usocs that were automatically identified—associated with a particular ban. Generally, this is done once, i.e., at the time a new ban is configured for the system. Once this is mapped, it may be updated, changed, adjusted, or modified when a Vendor changes their price in their contract, a Vendor puts a new usoc on the bill, or perhaps the sell side usocs associated with the buy side usocs change.

A usoc that is configured may have or be associated with a "date_start" which indicates the date when this usoc configuration takes affect. For example "usoc ABC" may have a "date_start" of 2011 Jan. 1 with a configured amount of 10 dollars. The same "usoc ABC" can have another entry of 2011 Mar. 1 with a configured amount of 20 dollars. If a bill with a "bill_date" of 2011 Feb. 1 is processed, the 2011 Jan. 1 configuration is used for "usoc ABC" with a configured amount of 10 dollars. However, if a bill with a "bill_date" of 2011 Apr. 1 is processed, the 2011 Mar. 1 configuration is used for "usoc ABC" with a configured amount of 20 dollars.

Further, each usoc configured can have multiple amounts based on criteria associated with a circuit. Zones and rate groups are an example. A usoc may have a different cost based on the circuit location. The system identifies the NPANXX (or the first 6 digits of the circuit) to identify which zone the circuit is associated with for that particular ban. Each configured usoc in the usoc configuration can have a different amount for the various zones/rate groups.

If a new usoc is discovered in a subsequent bill, that usoc is highlighted (e.g., colored in red) in the usoc configuration table for the mapper to assign sell side usocs. The user is prompted to configure the usoc before proceeding with analysis.

At this point, the normalized data has been remapped and can be further used for processing. In a specific implementation, the profiles are periodically retested to verify their accuracy. In a specific implementation, to continuously verify the accuracy of the profiles, the profiles are tested daily to assert that they are producing the correct normalization results. Alternatively, profiles may be tested weekly, monthly, or at some other interval depending upon the situation. Previously failed bills that required profile updates become part of the tests.

Referring now to FIG. 7, after profiling 730, all unique circuits are pulled from the normalized buy_side data and a request 780 is sent by indexing component 735 to telecommunications company's billing system 713 to retrieve valid circuit level information for the buy side bill "bill_date" which is returned 785 to first scrubbing component 740 of the system.

Figure 22:
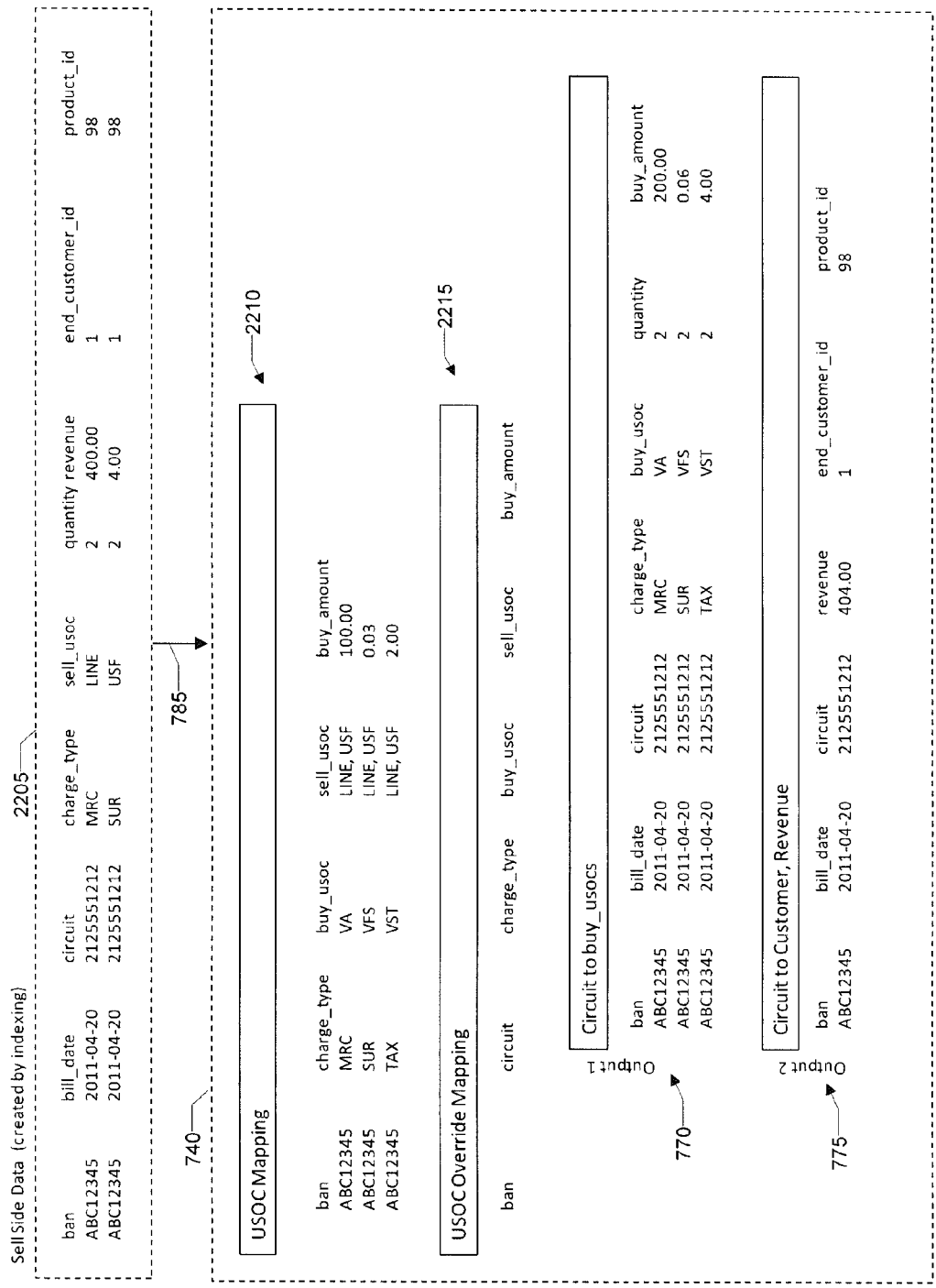
FIG. 22 shows a flow for scrubbing by translating "sell side" data to "buy side" data during indexing.

FIG. 22 shows a block diagram for transforming sell side data (e.g., "sell_usoc") to buy side data (e.g., "buy_usoc") via first scrubbing component 785. Sell side data 2205 is returned from telecommunications company's billing system 713 (FIG. 7) and first scrubbing component 740 of the system. First scrubbing component 740 includes a USOC mapping subcomponent 2210 and a USOC override mapping component 2215.

The sell side data indicates products sold by the telecommunications company to the end-customers. The sell side data may be referred to as a circuit level information and may include circuit, charge_type, sell_usoc, quantity, (revenue), end_customer_id by ban and bill_date, or combinations of these.

The first scrubbing component (or first scrubbing process) transforms the telecommunications company's sell_usocs to the buy_usocs, using the data retrieved from indexing, i.e., circuit level information or the "sell side data" 2205. In a specific implementation, there are two outputs from the first scrubbing processes. First output 770 (see also FIG. 7) includes a list of circuits with their associated buy_usocs and prices that should be on the circuit. Second output 775 (see also FIG. 7) includes a list of circuits and their end_customer_id (which identifies which end customer this circuit belongs to), product_id (the product line that the telecommunications company classifies this circuit), and the revenue associated to this circuit. This is also associated to the ban, bill_date.

In a specific implementation, to produce the first output, for each circuit found in the telecommunications company, the sell_usocs are identified and translated to their buy_usocs through the usoc or usoc_icb mapping tables. Specifically, the usoc mapping table associates a buy_usoc to one or more sell_usocs, irrespective of circuit.

The usoc_icb mapping table 2215 is an override for the usoc table which associates a buy_usoc to one or more sell_usocs for a given circuit. This table may have an entry for a circuit if the telecommunications company made a special one time exception with the vendor for a different rate than the standard contracted rate for the buy_usoc.

In a specific implementation, for the first output, since a sell_usoc could be mapped to many buy_usocs in the usoc mapping table, all potential buy_usocs are pulled using the usoc mapping table 2210). That is, a sell side product may be the combination of two or more buy side products. For example, a telecommunications company may purchase several products from a vendor (i.e., buy side or buy_usocs) and combine the products into a single product (i.e., sell side or sell_usoc) to be resold to an end-customer. A telecommunications company may purchase multiple products from different vendors and combine the products into a single product to be resold to an end-customer. In first output 770, sell_usoc "LINE" would be converted to "VA" (Quantity 2), "VFS" (Quantity 2), "VST" (Quantity 2), sell_usoc USF would be converted to "VA" (Quantity 2), "VFS" (Quantity 2), "VST" (Quantity 2). In the case where there is an override entry in the usoc_icb mapping table 2215 for the circuit, the buy_usocs are used from the entry in the usoc_icb mapping table for the circuit. For the sell side data 2205, this results in first output 770.

Another example of how the scrubbing would work would be, based on sell side data 2205, if 2125551212 had "LINE" (Quantity 2), and "USF" (Quantity 4 instead of 2), then the result would also have 3 rows in first output 770, however the quantity would be 4 for all rows, since USF is mapped to buy usocs (MRC-VA, SUR-VFS, TAX-VST).

Another example of how the scrubbing would work would be, based on sell side data 2205, if 2125551212 had MRC-LINE quantity 2 revenue 400, another entry of MRC-LINE quantity 5 revenue 0, the max quantity is used for mapping purposes. In this example, the sell side data comes from various areas of the sell side billing where MRC-LINE quantity 2 revenue 400 is coming from the actual bill sent to the end customer (and has the revenue value) and MRC-LINE quantity 5 revenue 0 is coming from a system that stores usocs that were ordered from the vendor (and accurately houses the quantity, but not what is billed to an end customer). Therefore in this implementation, the quantity with the highest value 5 is used to accurately reflect the quantity, since in this scenario the quantity is correct in system that stores usocs that were ordered. The revenue coming from MRC-LINE for 21245551212 is still 400 which is the value found for MRC-LINE quantity 2 (which is coming from the actual bill sent to the end customer (and has the revenue value)). For the sell side data 2205, for second output 775, each circuit found in the telecommunications company is linked to an end_customer_id, the telecommunications company's product_id (product line), and revenue for that circuit. In a specific implementation, only revenue that is mapped (the sell_usoc must be found in the usoc mapping table) is pulled or retrieved. The distinct sell_usocs are taken from the usoc mapping table. All revenue associated to these distinct sell_usocs are pulled. In the case where there is an override entry in the usoc_icb mapping table for the circuit, the values in the usoc_icb mapping table is used to pull the revenue.

The example above is merely one example on how the sell side billing system may track their inventory (sell side data). This is merely one example of how for a circuit 2125551212, two databases have different pieces of information. In this example, one database has the "billing data,"—i.e., what the Telecommunications Company charges their end-customer, quantity 2 for 400. The other database in this example stores the ordering information used to purchase this feature or product. In this example, the telecommunications company bought 5 units, revenue is 0 dollars, since this database does not store charges to their end customer. Therefore, when the system indexes this, 2125551212, has 5 units for 400. Alternatively, there can be a single database or data source having the information (e.g., circuit, usoc, quantity, and revenue).

Referring now to FIG. 7, first and second outputs 770 and 775, respectively, from first scrubbing component 740 and normalized buy side data 755 from profiling 730 are inputs to second scrubbing component 745. After processing the inputs, second scrubbing component outputs first output 715, second output 720, or both.

Figure 23A:
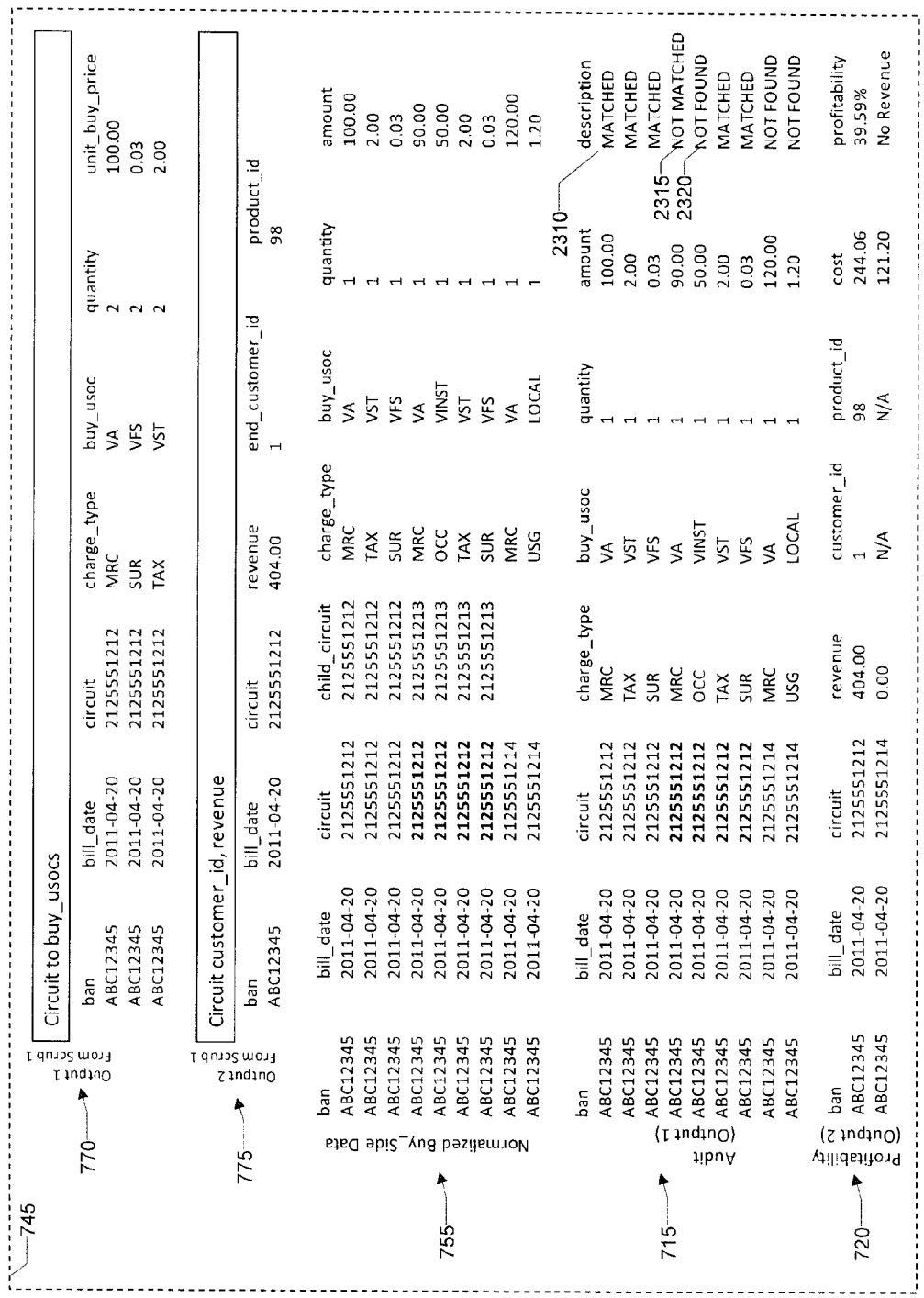
FIG. 23A shows a flow for generating audit and profitability results.

More particularly, FIG. 23A shows a detailed block diagram for second scrubbing component 745. The second scrubbing component or stage includes a process that takes the normalized buy_side data 755 and compares this against first output 770 and second output 775 from first scrubbing 740 (FIGS. 7 and 22). Since all circuits are in the same format and usocs are in the same format (buy_usocs), the wtn and usocs can be compared one to one with their associated quantity and amounts. FIG. 23A shows a detailed view of first and second output 715 and 720, respectively, from second scrubbing component 745. As shown in FIG. 23A, first output 715 includes an audit file or table. Second output 720 includes a profitability file or table.

In a specific implementation, first output 715 includes a file or table, by wtn/buy_side usoc, identifying at the circuit level, by usoc—the audit results. In this specific implementation, this is by ban and bill_date. Circuit to buy_usocs (i.e., first output 770 from the first scrubbing component) is used to see if a usoc is MATCHED, NOT MATCHED, or NOT FOUND in normalized buy_side data 755.

A MATCHED result 2310 indicates the buy_usoc was found in the telecommunications company's billing and inventory system and the amount charged is correct.

A NOT MATCHED result 2315 indicates the buy_usoc was found in the telecommunications company's billing and inventory system but the amount charged is not correct.

A NOT FOUND result 2320 indicates the buy_usoc was not found in the telecommunications company's billing and inventory system.

In a specific implementation, second output 720 includes a file or table, by wtn, identifying at the circuit level, end_customer level the profitability of the circuit. The circuit customer_id, revenue is merged with normalized buy_side data 755. Since each circuit is tagged with a ban, bill_date, customer_id, product_id. Cost, revenue, and profit for a circuit can be retrieved by ban (including vendor and state, since each ban is associated to a vendor and state), by a bill_date or bill_month, by a particular end_customer (since the circuit is tagged with the end_customer_id), or by the product_id (since the circuit is tagged with the telecommunications company's product_id). Additional tags can be assigned to give even more view criteria for this data. (See FIG. 23B).

In a specific implementation, cost and profitability is identified for all circuits. In the event that a circuit is not found at the telecommunications company (e.g., 2155551214 as shown in first output 715), the profitability is indicated as "No Revenue."

In a specific implementation, profitability is calculated as (revenue by circuit minutes cost by circuit) divided by revenue by circuit. The profitability may be expressed as a percentage.

FIG. 23B shows a table 2350 listing some of the information or tags may be associated with a wtn, a description of the tag, and a source of the tag. It should be appreciated that a wtn does not necessarily have to be associated or tagged with all of the tags shown in the table. That is, a wtn may be tagged with a subset of the tags shown in the table. Tagging the wtn with some or all of the information shown in FIG. 23B allows the system to generate a variety of detailed reports at the wtn level. Report results can be aggregated, filtered, sorted, and grouped using any criteria or combination of criteria shown in the table. For example, wtn's may be filtered by geographical location such as by state via the "state" tag.

A report may be produced ranking or showing the wtn's (and associated end-customer) with the highest (or lowest) profitability via the "profitability" and "customer_name" tags—just to name a few examples. This allows, for example, the telecommunications company to manage profitability by identifying end-customers having a positive impact on profitability and end-customers having a negative or less positive impact on profitability. For end-customers having a positive impact on profitability, the telecommunications company may offer those end-customers preferred services or promotions in order to retain the end-customers. For end-customers having a negative or less positive impact on profitability, the telecommunications company may find it necessary to raise rates, renegotiate contracts, or terminate the relationship.

FIGS. 24A-31B show some screen shots of a specific implementation of the system. In this specific implementation, the screen shots are of Web pages generated by the system and displayed on an electronic screen to a user. The following description is for a specific implementation of a system of the invention called "Phoenix." A system of the invention may be known by any name or identifier, and this description is provided merely as a sample implementation. It should be understood that the invention is not limited to the specific features presented. A system of the invention may have additional features (not necessarily described in this application), different features which replace some of the features or components presented, fewer features or a subset of the features presented, or features in a different order than presented, or any combination of these. Aspects (e.g., screens or Web pages) of the invention may be modified or altered as appropriate for a particular application or use.

FIGS. 24A-B show a profile selection page. FIG. 24A shows a top portion of the page. FIG. 24B shows a bottom portion of the page. This page allows the user to select which profile should be used to analyze a bill (e.g., process and validate the bill) such as by clicking on the desired profile name. As discussed, a vendor (e.g., Verizon) may use several different billing formats. Thus, this screen allows the user to select a profile that would be appropriate for analyzing a bill having one of multiple possible billing formats from a specific vendor.

In a specific implementation, the user selects the profile before the bill is submitted to the system. In other words, in this specific implementation, the system receives a user selection of a profile to be used to analyze a bill before the system receives the actual bill. A bill can be very large (e.g., several megabytes in size). So, one benefit of this approach is that the user can select which profile to use and after the profile selection is made, the user can begin the process of submitting the bill to the system (e.g., uploading the bill to the system). Since the bill submission process can take some time depending on factors such as the size of the bill, network connection, and so forth the user does not have to monitor the bill submission process to wait for the process to complete in order to select the profile. The user is free to do other things and once the bill submission process is complete, the system can automatically analyze the bill using the previously selected profile.

Further, this feature of selecting the profile before the bill is submitted to the system can facilitate batch submissions of bills (e.g., uploading two or more bills to the system in batch). A batch of bills can be quite large in size. Thus, the user can make a profile selection and after making the profile section, the user can begin the batch uploading process of submitting the bills to the system. The user can time the process such that it occurs off-hours (e.g., at night) in order to conserve computing resources for other tasks during the work day. For example, when the user is about to leave work for the day, the user can make a profile selection, begin the batch submission process, and when the submission process completes (such as in the middle of the night while the user is home or is sleeping), the system can automatically begin analyzing the bills using the previously selected profile.

In another specific implementation, the system receives a user selection of a profile to be used to analyze a bill after the system receives the bill. The system can make an initial pass of scanning the bill, identify the specific vendor, and present the user with a subset of profiles associated with the specific vendor, each profile of the subset being designed for a specific billing format associated with the specific vendor. The user can then select from among a limited set of profiles which profile would be appropriate for analyzing the bill having that specific billing format. This can help to prevent the user from being overwhelmed with a lengthy listing of profiles from which to choose. Narrowing the profile selection choices can also help prevent the user from selecting an incorrect profile.

In another specific implementation, the system automatically selects which profile to use based on criteria such as the name of the vendor, other distinguishing characteristics, or both. For example, as discussed, in some cases there may be several different billing formats that a specific vendor may use. In these cases, selecting a profile based merely on vendor name may not be sufficient because two bills from the same vendor may each have a different format. So, in this specific implementation, the system can use the vendor name in conjunction with one or more other distinguishing features of the bill to automatically select the appropriate profile. In an implementation, after the system automatically selects the profile, the system prompts the user for verification or confirmation that the correct profile has been selected. For example, the system may display a dialog box having the message "The system has identified Profile T should be used to analyze this bill. Please confirm."

FIG. 24C shows a usoc configuration table 2405 to show how a telecommunications company may configure buy_usocs 2410 (e.g., products purchased from vendors) to their sell_usocs 2415 (e.g., products resold to end-customers).

A visual indication may be displayed on the screen to indicate usocs that need to be configured. For example, in a specific implementation, usocs that are displayed in the color red represent new usocs that have been found on the bill that need to be configured. To configure the new usocs, the telecommunications company user clicks on a plus button 2420 to add the sell_usoc, the date when this configuration takes effect.

Clicking on the USOC_2 link shows all the other rates that could be associated to this usoc. (based on the circuit, for example density zones, rate groups by NPANXX).

FIG. 25 shows a usoc_icb (individual case basis) configuration table 2505 to show how a usoc associated with a circuit can be overridden using the usoc_icb functionality. For example, in this specific implementation, the telecommunications company user may click the amount shown in the ICB Amount column to override, change, revise, adjust, modify, update, or edit the displayed amount to a different amount. Another implementation may only allow the ICB details to be changed when fixing fallout. For example, the reseller would only be able to ICB a USOC to the buy side amount on the bill.

One benefit or reason for the usoc_icb configuration table is because a telecommunications company may have different pricing for a given usoc based on when they may have purchased the circuit from their vendor. Therefore, a given usoc may have a different price for one circuit when compared to another circuit in the same bill. In order to accommodate these differences which happen on an individual case basis, the system allows overrides using the usoc_icb configuration. In this specific implementation, the usoc_icb configuration contains a circuit, the buy side usoc, the sell side usocs associated to the buy side usoc, the override amount, and a date when this rule is used to override the usoc configuration. During indexing and scrubbing, based on the ban and the bill_date, the usoc_icb configuration is read to see if there are any circuits that will have usoc_icb overrides which will override the base usoc configuration for the given bill_date.

Figure 26:
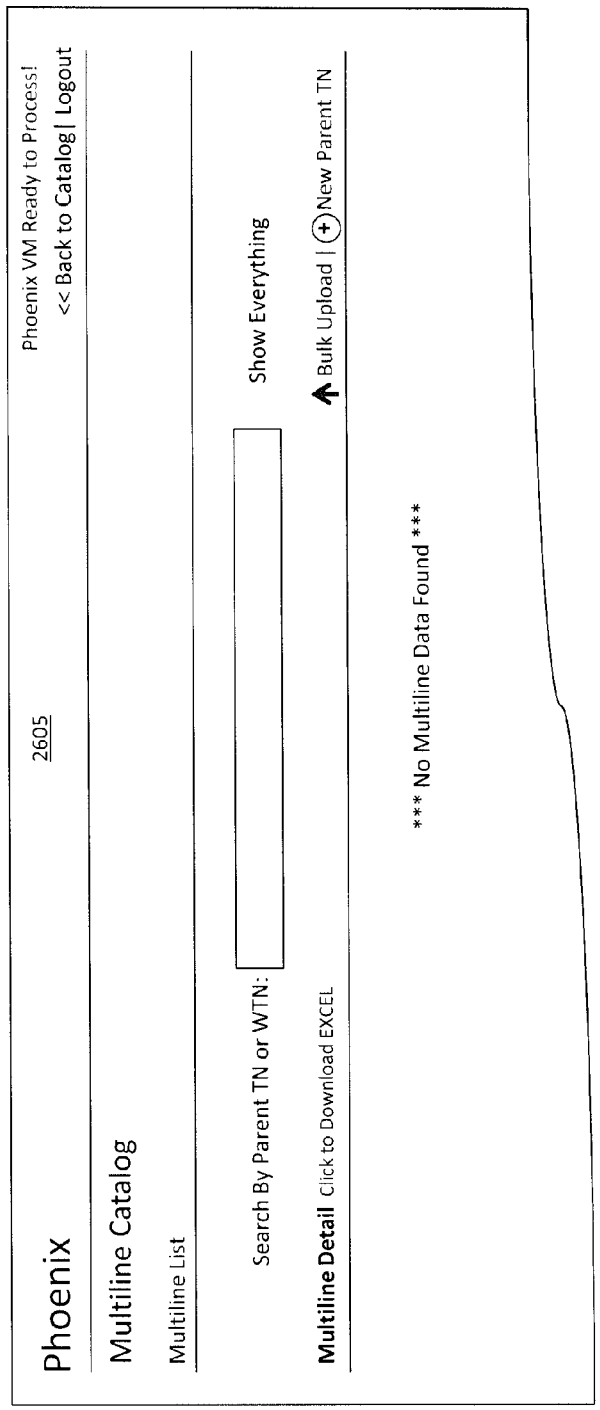
FIG. 26 shows a page for searching a multiline configuration table.

FIG. 26 shows a multiline configuration table and, specifically, an example of a screen 2605 for searching a multiline catalog. When multilines are not configured for a particular ban, the table is empty. The telecommunications company user can search for a particular parent/wtn in this ban to edit/delete an entry.

Figure 27:
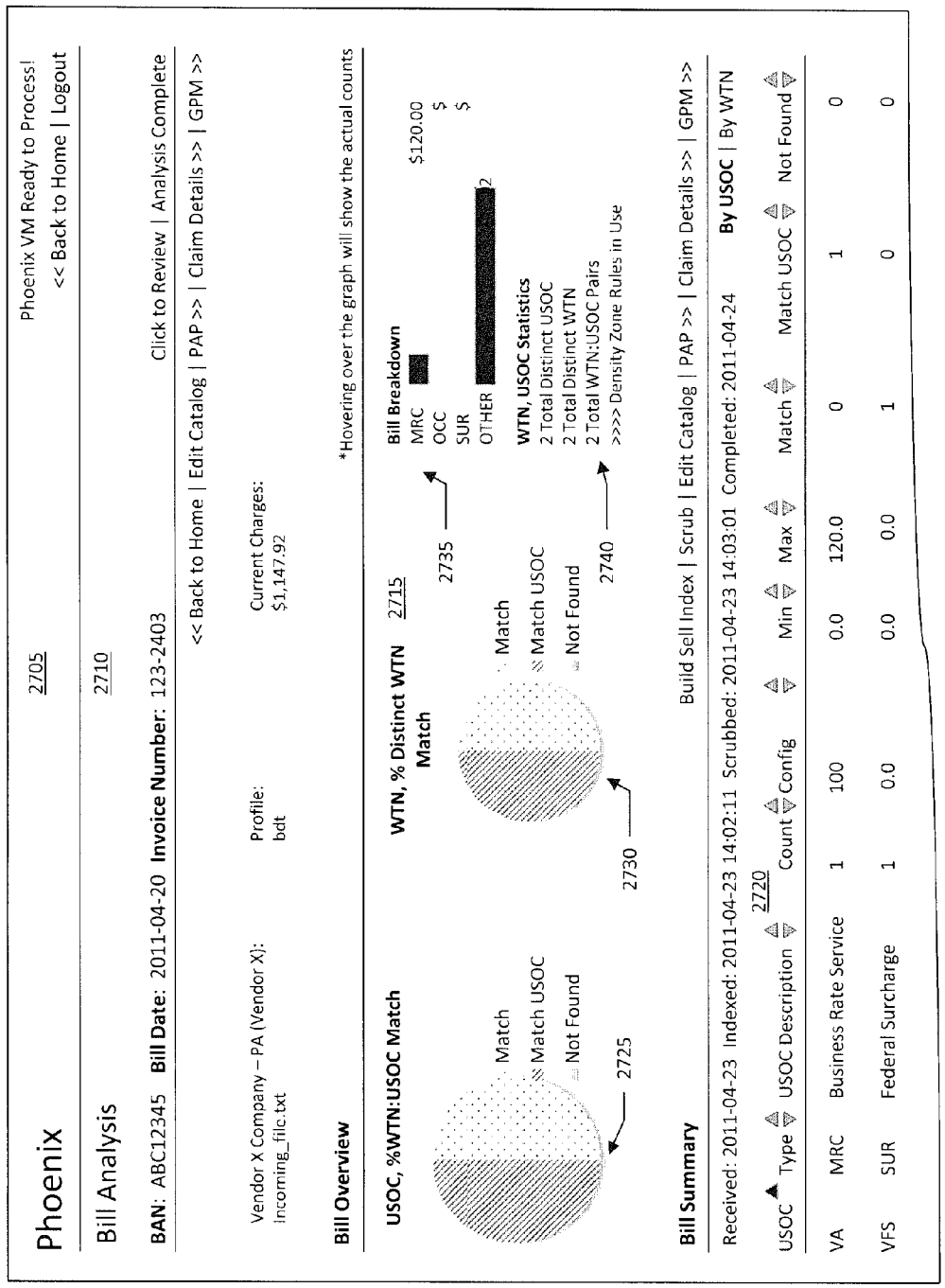
FIG. 27 shows a page for viewing a summary of scrubbed data.

FIG. 27 shows a summary view or summary page 2705 of scrubbed data. The summary page shows the result of the indexing/parsing stages. This example of the summary page includes a first section 2710, a second section 2715 below the first section, and a third section 2720 below the second section. The first section includes information identifying the vendor, invoice, and profile associated with the vendor that was used to analyze the invoice.

The second section includes first and second pie chart 2725 and 2730, respectively, which each include a legend, bill breakdown bar charts 2735, and a WTN, USOC Statistics table 2740.

The first pie chart shows the number of USOCs found that have matched, not matched, or not found. In this example, 50 percent of the USOCs have matched, and 50 percent have not matched.

The second pie chart shows the number of circuits which have matched, not matched, or not found. (e.g., only 50 percent of the circuits are correct).

A link labeled "PAP" (i.e., "Process Accounts Payable") leads to a screen for fixing fallout (FIG. 28). A link labeled "Claim Details" leads to the details of each USOC by circuit. A link labeled "GPM" leads to the profitability report of the ban.

FIG. 28 shows a page 2805 for fixing fallout, (e.g., NOT MATCHED, NOT FOUND). The telecommunications company user uses the Process Accounts Payable (PAP) screen to fix fallout from a bill. Fallout refers to products (e.g., usocs) that have been identified as NOT MATCHED or NOT FOUND by second scrubbing 745 (see FIG. 23). This stage may be referred to as a fixing not matched, not found items stage.

In other words, in a specific implementation, after a bill is scrubbed, each circuit/usoc is tagged as MATCHED, NOT MATCHED, NOT FOUND. NOT MATCHED and NOT FOUND are considered fallout. These tagged circuit/usocs are resolved so that analysis can be complete. Depending on how the fallout is resolved, this can potentially affect the profit margins associated with the services and features.

In PAP, (process accounts payable), the user can resolve this fallout by assigning it one of four statuses including a first status 2810A, a second status 2810B, a third status 2810C, or a fourth status 2810D. The first status is labeled "Claim." The second status is labeled "OK—One Time." The third status is labeled "OK—Add to Billing." The fourth status is labeled "OK—ICB."

In brief, this stage leverages first output 715 from FIG. 23. USOCs that are found to be NOT MATCHED, or NOT FOUND can be resolved as: (1) "Claim" to tag this circuit/usoc as a claim item, (2) "OK—One Time" to allow this to pass for this ban, bill_date, (3) "OK—Add to Billing" to tag this as circuit/usoc as an item to add to the telecommunications company's billing system due, since the vendor is correct, or (4) "OK—ICB" to add this to the usoc_icb configuration table which is an override mapping for the buy_side usoc for this particular circuit.

In this exemplary scenario, usoc "VA" was billed at $120, but configured at $100. The telecommunications company user can "claim," "OK—One Time," "OK—Add to Billing," or OK—ICB the item. In this scenario the telecommunications company user opts to claim this as a discrepancy as indicated by the filled radio button next to the option "claim."

More particularly, first status 2810A ("Claim") indicates that the usoc has been incorrectly billed by the Vendor and the Telecommunications Company will dispute the charge. Data associated with the disputed circuit/usoc is tagged to be claimed, i.e., to be disputed with the vendor. The vender may be sent the dispute, potentially decreasing cost for this ban. By default the system calculates the amount of the dispute. For example, in FIG. 28, if the Telecommunications Company was billed 120 dollars, but was supposed to be billed 100 dollars, then the claim would be for 20 dollars (i.e., 120 dollars–100 dollars=20 dollars). Based on the amount that was claimed, the potential profit margin could be affected, since the cost for the services and features would be reduced.

Second status 2810B ("OK—One Time") indicates that although this usoc was a fallout, the user can OK this for this bill or allow this fallout for this particular bill (for this bill_date). In other words, this status allows the Telecommunications Company to make a one-time exception. An example of this would be a feature that was agreed to be disconnected, but due to timing reasons, the bill was already sent out by the Vendor.

Third status 2810C ("OK—Add to Billing") indicates that the Telecommunications Company has decided to add the fallen-out usoc to their billing system. That is, data associated with the circuit is added to the Telecommunications Company's billing system. For example, after investigating the fallen-out usoc, the Telecommunications Company may find that the usoc should be on the sell side, and thus has decided to add this to their billing system. The system can identify the sell side usocs and the additional sell amounts to be added to the billing system through the data provided by the Telecommunications Company's billing data, or the sell side usocs and the additional sell amounts can be manually assigned. Based on the amount that was added, the potential profit margin could be affected, since the revenue for the services and features would be increased.

Fourth status 2810D ("OK—ICB") indicates that the billed amount is correct, and the base mapping needs to be overridden. The system generates an ICB for this circuit/usoc starting with this bill_date. For this ban, circuit, usoc, this billed amount will be used as an override for subsequent scrubs from the bill date forward. For example, in FIG. 28, if the fourth status "OK—ICB" was selected, the billed amount 120 dollars would be the icb amount, and the date start would be 2011 Apr. 19 (one day before this bill). Therefore, if this bill was to be scrubbed, or bills later than 2011 Apr. 19 were scrubbed, the configured amount for 9734441209 would be 120 dollars versus 100 dollars for buy side usoc VA.

Figure 29:
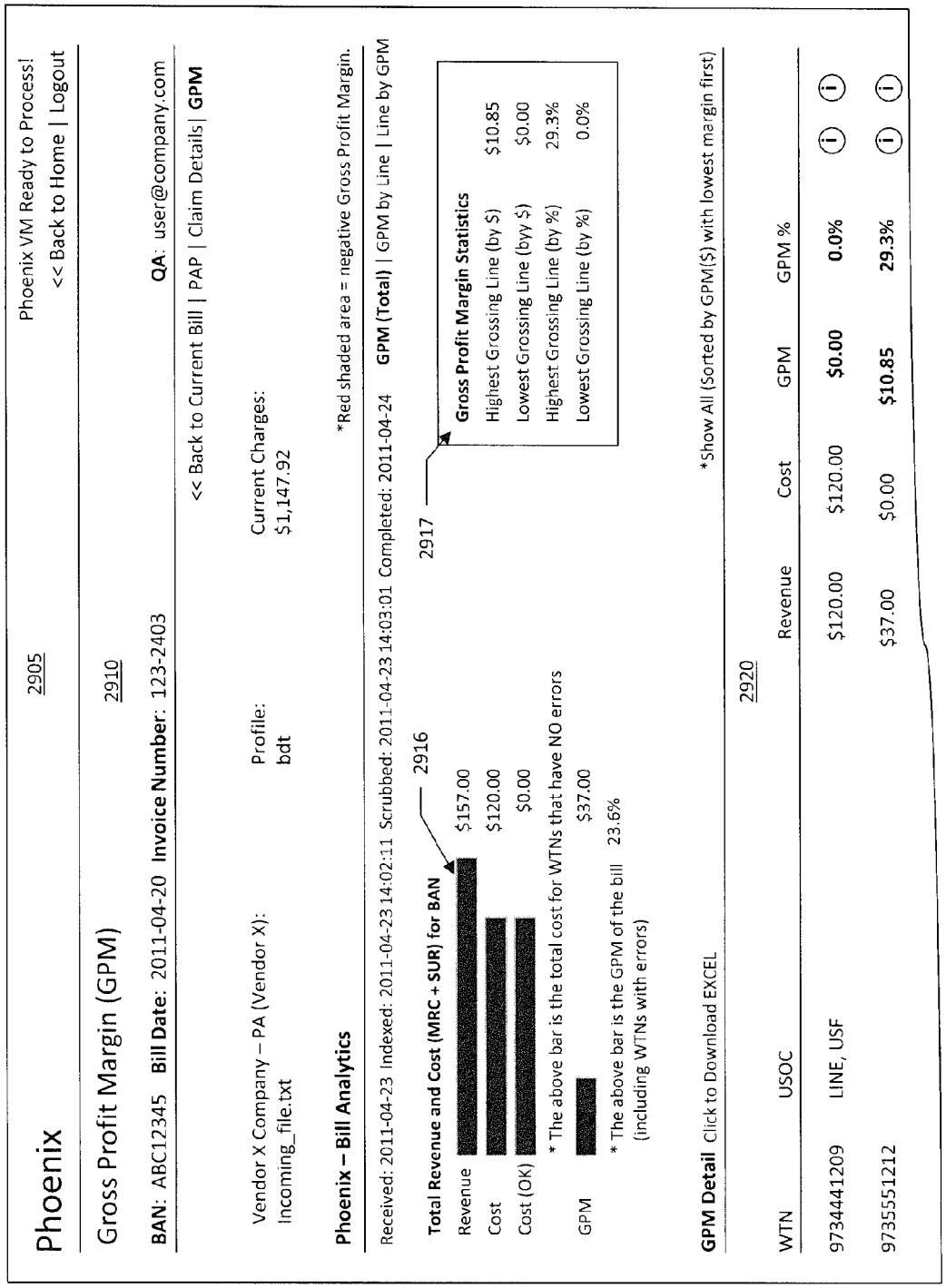
FIG. 29 shows a page for the profitability of a ban.

FIG. 29 shows the profitability of a ban. A page 2905 is an example of how ban level gross profit margin (GPM) is shown to the telecommunications company user. This page displays the cost and revenue associated to each line. In an implementation, since the profitability is down to the circuit, the system can do lots of different views of the profitability. The circuit is tagged with a product_id, ban, bill_date, user (person that is fixing the circuit), end_user—the end customer, vendor, state, etc. Therefore the system can let the telecommunications company view profitability in many different ways. Generally, the telecommunications industry revolves around wtn, and usocs. The system identifies profitability down to the wtn so that the reseller has full visibility.

This example of the gross profit margin page includes a header section 2910, bill analytics section 2915, and a gross profit margin detail section 2920. The header section displays information such a billing account number, bill date, invoice number, vendor, profile used to analyze the bill, and current charges.

The bill analytics section displays total revenue and cost. The revenue indicates the amount of money collected or charged to end-customers. The cost indicates the amount of money spent to purchase the products provided to the end-customers. The bill analytics section includes revenue, cost, and gross profit margin bar charts 2916 to help the user visualize the difference between the absolute revenue, cost, and gross profit margin figures. There is a first total cost component and a second total cost component (i.e., "Cost OK"). The first cost component represents the total costs for the wtn's or working telephone numbers, regardless of whether or not there are errors. The second cost component represents the total costs for wtn's that have no errors. In other words, if a wtn has an error, the cost associated with the wtn is omitted from the second cost component.

The bill analytics section further includes a gross profit margin statistics subsection 2917 which displays figures or values for highest grossing line and lowest grossing line, expressed as an amount (e.g., dollar amount) and expressed as a percentage.

Gross profit margin detail section 2920 includes a table having columns "WTN," "USOC," "Revenue," "Cost," "GPM $," and "GMP %" to display detail at the wtn level. For example, a row of the table includes a wtn (e.g., "9734441209") associated usocs (e.g., "LINE, USF"), associated revenue (e.g., "$120.00"), associated cost (e.g., "$120.00"), gross profit margin expressed as a dollar figure (e.g., "$0.00"), and gross profit margin expressed as a percentage figure (e.g., "0.0%").

Figure 30A:
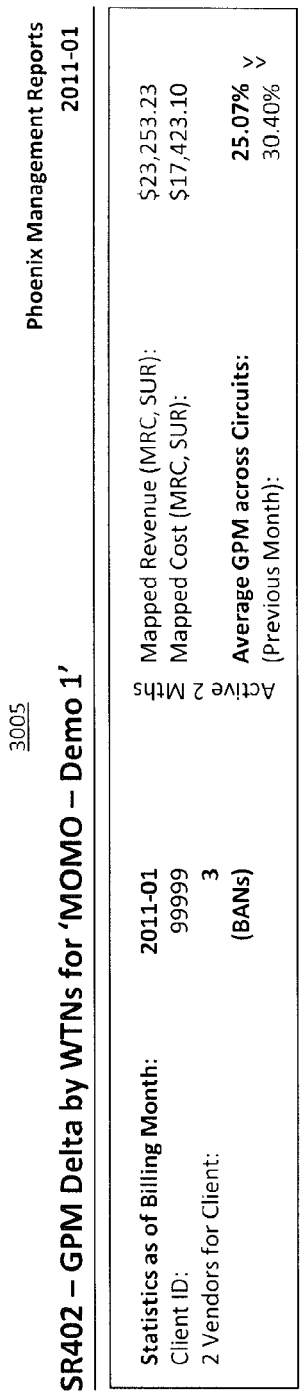
FIG. 30A shows a top portion of a page for displaying profitability.

FIGS. 30A-30B show a page 3005 for gross profit margin delta by wtns. FIG. 30A shows a top portion of the page. FIG. 30B shows a bottom portion of the page. This page shows active_wtn profitability for an end_customer. Page 3005 is an example of using the active_wtn cost and revenue to determine the profitability of a particular end_customer. This stage may be referred to as an active WTN stage. This stage leverages second output 720 (FIG. 23) from second scrubbing 745.

Typically, calculating profit margins for an existing account for a given month is given by the formula: "circuit revenue" minus "circuit cost." However, telecommunications products have many additions, changes, and deletes of circuits from month to month. For example, last month a circuit could have existed, but this month that same circuit may have been disconnected. If the profit margin was calculated using only the circuits found this month, the calculation would be including a circuit that did not exist the previous month. This specific implementation of the system uses a method called "Active WTN" so that a telecommunications company can see true profitability.

"Active WTN" includes a method that identifies the profitability of a given month, for only the circuits that have been active the given month and its previous month. Using this method, the telecommunications company can compare the GPM from a given month to the GPM from its previous month. In an embodiment, the GPM (WTN) Statics is a graphical method used to show how the profit margin has changed from the previous month when compared to the report month. Since all circuits are tagged by the telecommunications company (end_customer_id, product_id, ban, bill_date, vendor, state, and so forth)—these other views are may also be generated. In this example, end_customer is shown.

In a specific implementation, a method for determining profitability of a time frame having a first set of active circuits includes identifying a second set of circuits that were active in a previous time frame. Comparing the first set of active circuits with the second set of circuits to select a subset of active circuits, where each circuit in the subset was active during the time frame and the previous time frame. Calculating a profitability of the time frame based on the subset of active circuits. Thus, in this specific implementation, there may be a case where a circuit that was active in the time frame is excluded or is omitted from the profitability calculation because the circuit was not active in the previous time frame.

In a specific implementation, the time frame and previous time frame are consecutive or sequential. For example, if the time frame is July 2011, the previous time frame is June 2011. In another specific implementation, the time frame and previous time frame may be non-consecutive or non-sequential. For example, if the time frame is July 2011, the previous time frame may be April, 2011. This allows the telecommunications company to make consistent comparisons of profitability between nonconsecutive time frames. As an example, the telecommunications company may be interested in how profitability varies between the winter and summer months.

In a specific implementation, the time frame has a duration of one month. However, it should be appreciated that different duration may instead be used (e.g., two month, week, quarter, year, and so forth).

In another specific implementation, a method includes receiving a bill for a billing period from a vendor. The bill including a first telephone number, a second telephone number, and charges for one or more telecommunication products provided at the first and second telephone numbers. The method includes calculating a profitability for the billing period. The calculating includes determining that the first telephone number was included in a previous bill from the vendor and that the second telephone number was not included in the previous bill. The previous bill is for a previous billing period immediately before the billing period. That is, the previous billing period and billing period are consecutive or follow one another in an uninterrupted succession or order. The method further includes performing a computation or mathematical computation. The computation involves a first value and a second value. The first value includes a summation of the charges for the one or more telecommunication products provided at the first telephone number. The second value includes a revenue amount collected or to be collected from an end-customer of the first telephone number for the one or more telecommunication products provided at the first telephone number. The method further includes displaying (e.g., displaying on an electronic screen of computer) a result of the computation. The result is the profitability for the billing period, where the charges for the one or more telecommunication products provided at the second telephone number, and a revenue amount collected from an end-customer of the second telephone number are omitted from the profitability computation.

Figure 31A:
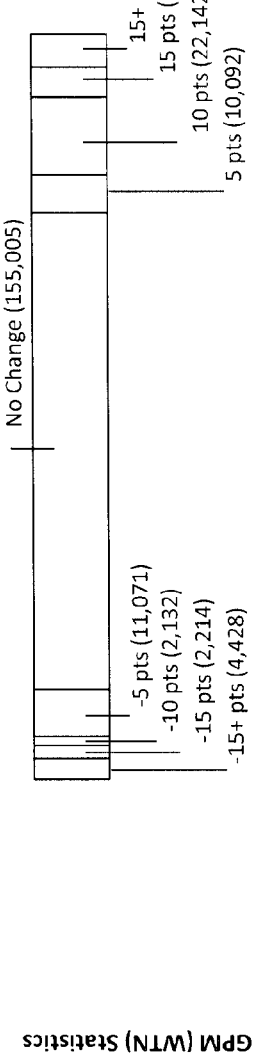
FIG. 31A shows a top portion of another page for displaying profitability.
Figure 31B:
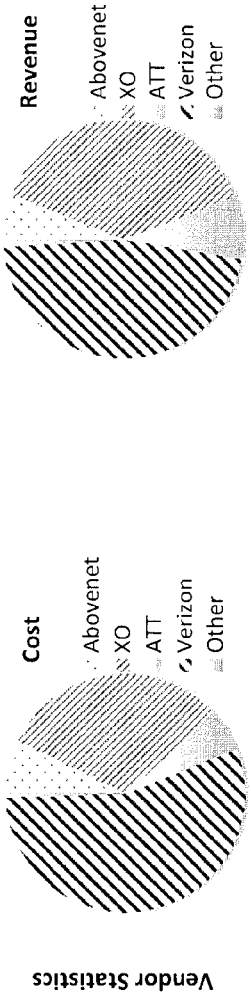
FIG. 31B shows a bottom portion of the page shown in FIG. 31A.

FIGS. 31A-31B shows a page 3105 for vendor gross profit margin delta by wtns. FIG. 31A shows a top portion of the page. FIG. 31B shows a bottom portion of the page. This page shows active_wtn profitability for all bans. Page 3105 is an example of using the active_wtn cost and revenue to determine the profitability of all bans. As discussed above, the GPM (WTN) Statics is a graphical method used to show how the profit margin has changed from the previous month when compared to the report month. Since all circuits are tagged by the telecommunications company (end_customer_id, product_id, ban, bill_date, vendor, state, etc.)—these other views may also be generated. In this example, all bans for a bill_date is shown.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for using a computer to reconcile telecommunication company's costs with telecommunication company's revenue attributable to telecommunication products provided to end-customers based on a contract between a vendor of the telecommunication products and a telecommunications company, the method comprising, at the telecommunications company's computer:
    receiving, by the computer, a bill from the vendor having an electronic format, the bill including charges billed to the telecommunications company for usage by the end-customers, who purchase the telecommunications products from the telecommunications company, wherein the bill includes a plurality of telephone numbers, each telephone number being associated with one of the end-customers, wherein the received bill spans two or more files;
    identifying, by the computer, the vendor by reading information identifying the vendor within the received bill;
    identifying the electronic format of each of the two or more files, the electronic formats including structured data which may be read directly by the computer, the electronic formats being selected from a group of electronic formats that includes unscanned Portable Document Format (PDF) files, wherein at least one of the two or more files is an unscanned PDF file;

associating, by the computer, each of the two or more files with a specific vendor profile selected from a plurality of vendor profiles, each of the plurality of vendor profiles including a different validation routine, the specific vendor profile including a vendor-specific validation routine that includes a plurality of rules, the plurality of rules including at least determining if a sum of entries in any of an adjustments field, a payments field, a MRC field, an OCC field, a usage field, a tax field, and a surcharge field equals a corresponding total value located in one of a header or a summary section of one of the two or more files, each field having a corresponding computer-readable value within the two or more files, the selected specific vendor profile for each of the two or more files corresponding to both the identified vendor and the identified electronic formats of the two or more files, the computer-readable values having PDF tags in the unscanned PDF file;

based on the specific vendor profile, extracting data from the unscanned PDF file by the computer, the extracted data including the plurality of telephone numbers, the extracting being performed by reading the PDF tags of the unscanned PDF file and transferring data from the PDF tags to a temporary data structure by using a mapping within the specific vendor profile, the mapping being based on an x,y location of the fields and a length of the fields within the two or more files;

validating, by the computer, the received bill by applying the plurality of rules of the validation routine to the temporary data structure, and comparing the extracted bill data and information in the contract;

storing, by the computer, the extracted plurality of telephone numbers in a database implemented on a storage device;

in response to receiving the bill from the vendor by the server, accessing a previous bill received from the vendor by the computer;

determining, by the computer, that a first subset of the plurality of telephone numbers found in the bill were not in the previous bill;

determining, by the computer, that a second subset of the plurality of telephone numbers found in the bill were in the previous bill;

tagging, by the computer, in the database each telephone number of the second subset with a tag indicating that the telephone number was found in the bill and the previous bill;

using the extracted data, calculating, after the validating the received bill, a profitability by the computer for a first time period of the end-customer identified in the extracted bill data, the profitability being based on revenue collected from the end-customer by the telecommunications company that has been separately billed to the end-customer by the telecommunications company and vendor product charges identified in the extracted bill data, wherein the vendor product charges are associated with the telecommunication products sold to the end-customer by the telecommunications company, and the calculating the profitability comprises:

accessing the revenue and product charges associated with the tagged telephone numbers in the database by the computer to include in the profitability calculation, thereby omitting from the profitability calculation for the first time period any telephone number that was active during the first time period and not active during a second time period before the first time period; and displaying the end-customer profitability by the computer.

2. The method of claim 1 wherein the plurality of rules includes:

summing values from the extracted bill data;

comparing the summation with a total from the extracted bill data; and if there is a discrepancy between the summation and the total, providing an indication of the discrepancy.

3. The method of claim 1 wherein the step of comparing the extracted bill data and information in the contract includes:

comparing products identified in the extracted bill data with contracted products identified in the contract; and if there is a discrepancy between the products and the contracted products, providing an indication of the discrepancy.

4. The method of claim 1 wherein the step of comparing the extracted bill data and information in the contract includes:

comparing product charges identified in the extracted bill data with contracted product charges identified in the contract; and if there is a discrepancy between the product charges and the contracted product charges, providing an indication of the discrepancy.

5. The method of claim 1 wherein the specific vendor profile includes a parsing routine that is specific to the vendor.

6. The method of claim 1 wherein the based on the specific vendor profile, extracting data from the bill comprises identifying a circuit included in the bill.

7. The method of claim 6 wherein the identifying a circuit comprises determining that a line in the bill includes at most 10 digits.

8. The method of claim 1 wherein the based on the specific vendor profile, extracting data from the bill comprises identifying one or more Universal Service Order Codes (USOC) included in the bill.

9. The method of claim 1 wherein the end-customer profitability is expressed as a percentage.

10. The method of claim 1 wherein the second time period is immediately before the first time period.

11. The method of claim 1 wherein the profitability calculation for the first time period is based on a telephone number that was active during both the first time period and the second time period.

12. A computer-implemented method comprising:

receiving, by a server, a bill for a billing period from a vendor, the bill including a first telephone number, a second telephone number, and charges for one or more telecommunication products provided at the first and second telephone numbers, the bill including charges billed to a telecommunications company for usage by end-customers associated with each of the first telephone number and the second telephone number, wherein the bill spans two or more files;

identifying, by the computer, the vendor by reading information identifying the vendor within the received bill;

identifying the electronic format of each of the two or more files, the electronic formats including structured data which may be read directly by the computer, the electronic formats being selected from a group of electronic formats that includes unscanned Portable Document Format (PDF) files, wherein at least one of the two or more files is an unscanned PDF file;

associating, by the server, each of the two or more files with a specific vendor profile selected from a plurality of vendor profiles, each of the plurality of vendor profiles including a different validation routine, the specific vendor profile including a vendor-specific validation routine that includes a plurality of rules, the plurality of rules including at least determining if a sum of entries in any of an adjustments field, a payments field, a MRC field, an OCC field, a usage field, a tax field, and a surcharge field equals a corresponding total value located in one of a header or a summary section of one of the two or more files, each field having a corresponding computer-readable value within the two or more files, the selected specific vendor profile for each of the two or more files corresponding to both the identified vendor and the identified electronic formats of the two or more files, the computer-readable values having PDF tags in the unscanned PDF file; and calculating, by the server, a profitability for the billing period, wherein the calculating comprises:

in response to receiving the bill from the vendor, accessing a previous bill received from the vendor;

based on the specific vendor profile, extracting the first telephone number and the second telephone number from the unscanned PDF file, the extracting being performed by reading the PDF tags of the unscanned PDF file and transferring data from the PDF tags to a temporary data structure by using a mapping within the specific vendor profile, the mapping being based on an x,y location of the fields and a length of the fields within the two or more files;

determining, by the server, that the first telephone number was included in the previous bill from the vendor and that the second telephone number was not included in the previous bill;

tagging the first telephone number with a tag indicating that the first telephone number is in the bill and the previous bill;

validating, by the server, the received bill by applying the plurality of rules of the validation routine to the temporary data structure, and comparing the extracted bill data and information in a contract between the vendor of the telecommunication products and the telecommunications company;

after the validating the received bill, performing, by the server, a computation involving a summation of the charges for the one or more telecommunication products provided at the first telephone number, and a revenue amount collected from an end-customer of the first telephone number for the one or more telecommunication products provided at the first telephone number, the revenue amount having been separately billed to the end-customer of the first telephone number by the telecommunications company; and displaying, on an electronic screen of a client coupled to the server, a result of the computation, the result being the profitability for the billing period, wherein the charges for the one or more telecommunication products provided at the second telephone number included in the bill for the billing period, and a revenue amount collected from an end-customer of the second telephone number are omitted from the profitability computation of the billing period.

13. The method of claim 12 wherein the previous bill is immediately before the bill.

\* \* \* \* \*